United States Patent
Zheng et al.

(10) Patent No.: US 12,047,886 B2
(45) Date of Patent: Jul. 23, 2024

(54) SIGNAL SENDING METHOD, SIGNAL RECEIVING METHOD, AND DEVICE

(71) Applicant: HUAWEI TECHNOLOGIES CO., LTD., Shenzhen (CN)

(72) Inventors: Juan Zheng, Beijing (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 17/377,537

(22) Filed: Jul. 16, 2021

(65) Prior Publication Data

US 2021/0345335 A1    Nov. 4, 2021

Related U.S. Application Data

(63) Continuation of application No. PCT/CN2020/071844, filed on Jan. 13, 2020.

(30) Foreign Application Priority Data

Jan. 18, 2019 (CN) .......................... 201910104172.6

(51) Int. Cl.
  *H04L 5/00* (2006.01)
  *H04J 11/00* (2006.01)
  (Continued)

(52) U.S. Cl.
  CPC ....... *H04W 56/001* (2013.01); *H04J 11/0073* (2013.01); *H04J 11/0076* (2013.01);
  (Continued)

(58) Field of Classification Search
  CPC . H04J 3/06–0617; H04J 11/0023–0093; H04J 2011/0003–0096;
  (Continued)

(56) References Cited

U.S. PATENT DOCUMENTS

2017/0223649 A1    8/2017  Ko et al.
2018/0139084 A1*   5/2018  Jung ................. H04W 56/0015
(Continued)

FOREIGN PATENT DOCUMENTS

CA     3031912 A1    2/2018
CN   106717075 A     5/2017
(Continued)

OTHER PUBLICATIONS

AT&T., "NR SS block and burst set composition", 3GPP Draft; R1-1710412,Jun. 17, 2017, XP051305011, total 5 pages.
(Continued)

*Primary Examiner* — Timothy J Weidner
(74) *Attorney, Agent, or Firm* — Maier & Maier, PLLC

(57) ABSTRACT

A signal sending method, a signal receiving method, and a device. The signal sending method includes: generating synchronization signals, where the synchronization signals include a first synchronization signal and a second synchronization signal; and sending the synchronization signals, where the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal. In this way, frequency domain resources occupied by the synchronization signals may be reduced, thereby saving frequency domain resources for another data transmission process. In addition, the two synchronization signals may further share a part of the frequency domain resources, thereby improving resource utilization.

10 Claims, 9 Drawing Sheets

(51) Int. Cl.

| | |
|---|---|
| *H04J 13/00* | (2011.01) |
| *H04W 16/14* | (2009.01) |
| *H04W 28/02* | (2009.01) |
| *H04W 56/00* | (2009.01) |
| *H04W 72/044* | (2023.01) |
| *H04W 72/0446* | (2023.01) |
| *H04W 72/0453* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ...... *H04J 13/0003* (2013.01); *H04J 13/0007* (2013.01); *H04L 5/0016* (2013.01); *H04L 5/0048* (2013.01); *H04W 16/14* (2013.01); *H04W 28/0215* (2013.01); *H04W 72/0446* (2013.01); *H04W 72/0453* (2013.01); *H04W 72/0466* (2013.01); *H04J 2011/0016* (2013.01); *H04J 2011/0096* (2013.01); *H04J 2013/0088* (2013.01); *H04J 2013/0096* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ....... H04J 13/0003–22; H04J 2013/0037–165; H04L 5/0001–26; H04L 7/0004–10; H04L 23/00–02; H04L 27/26–30; H04W 16/02–16; H04W 24/02–10; H04W 28/02–26; H04W 36/0005–385; H04W 48/02–20; H04W 56/0005–0095; H04W 72/02–569; H04W 74/002–0891; H04W 84/005–22; H04W 88/02–12; H04W 92/02–04; H04W 92/10–12; H04W 92/16–22; Y02D 30/70

See application file for complete search history.

(56) References Cited

U.S. PATENT DOCUMENTS

| | | |
|---|---|---|
| 2018/0324678 A1 | 11/2018 | Chen et al. |
| 2018/0376454 A1 | 12/2018 | åström et al. |
| 2019/0013985 A1* | 1/2019 | Takeda ............... H04W 56/0015 |
| 2021/0297175 A1* | 9/2021 | Yu ..................... H04W 56/0015 |
| 2021/0329577 A1* | 10/2021 | Jiang ................. H04W 56/0015 |

FOREIGN PATENT DOCUMENTS

| | | |
|---|---|---|
| CN | 108880606 A | 11/2018 |
| WO | 2018073683 A1 | 4/2018 |
| WO | 2018127027 A1 | 7/2018 |

OTHER PUBLICATIONS

Mediatek Inc. "Link Level Simulation Results for NR Initial Synchronization above 6 GHz with Updated Evaluation Assumptions." 3GPP TSG RAN WG1 Meeting #87. Reno, USA. Nov. 14-18, 2016. R1-1612127. 5 pages.

Sierra Wireless, NR SS Design for Wideband and Narrowband UEs, 3GPP TSG RAN WG1 Meeting #86bis, Lisbon, Portugal, Oct. 10-14, 2016, R1-1609818, 6 pages.

* cited by examiner

SIGNAL SENDING METHOD, SIGNAL RECEIVING METHOD, AND DEVICE

CROSS-REFERENCE TO RELATED APPLICATIONS

This application is a continuation of International Application No. PCT/CN2020/071844, filed on Jan. 13, 2020, which claims priority to Chinese Patent Application No. 201910104172.6, filed on Jan. 18, 2019. The disclosures of the aforementioned applications are hereby incorporated by reference in their entireties.

TECHNICAL FIELD

An exemplary embodiment relates to the field of communication technologies and to a signal sending method, a signal receiving method, and a device.

BACKGROUND

Generally, when accessing a wireless communication system such as a long term evolution (LTE) system or a new radio (NR) system, a terminal device first needs to implement synchronization with a network device in the wireless communication system. For example, the terminal device first obtains synchronization information of the network device by detecting a synchronization channel, where the synchronization information may include time synchronization information and/or frequency synchronization information and may further obtain information about a cell managed by the network device. In this way, normal data communication between the terminal device and the network device can be ensured subsequently.

Currently, synchronization channels are separately designed for terminal devices having different capabilities, and the different synchronization channels are independent of each other. For example, a non-narrowband internet of things (NB-IoT) terminal device, such as a terminal device in an (enhanced) mobile broadband ((e)MBB) service, may access an LTE system through a synchronization channel whose frequency domain bandwidth is six resource blocks (RB). In addition, an NB-IoT terminal device may access an NB-IoT system through a synchronization channel whose frequency domain bandwidth is one RB.

Because resources allocated to the synchronization channels cannot be reused for another data transmission process, resource utilization efficiency is reduced.

SUMMARY

Embodiments may provide a signal sending method, a signal receiving method, and a device, to improve resource utilization.

According to a first aspect, a signal sending method is provided. The method includes: generating synchronization signals, where the synchronization signals include a first synchronization signal and a second synchronization signal; and sending the synchronization signals, where the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

The method may be performed by a first communication apparatus. The first communication apparatus may be a network device or a communication apparatus that can support a network device in implementing a required function of the method. Certainly, the first communication apparatus may alternatively be another communication apparatus, for example, a chip system. Herein, an example in which the first communication apparatus is a network device is used.

In this embodiment, within the time domain resource in which the first synchronization signal and the second synchronization signal overlap, there is the intersection set between the frequency domain resource corresponding to the first synchronization signal and the frequency domain resource corresponding to the second synchronization signal. This is equivalent to that the two synchronization signals are enabled to be not completely independent, but partially overlap in frequency domain. In this way, frequency domain resources occupied by the synchronization signals may be reduced, thereby saving frequency domain resources for another data transmission process. In addition, the two synchronization signals may further share a part of the frequency domain resources, thereby improving resource utilization. In addition, different synchronization channels are enabled to be not completely independent, but partially overlap, to reduce implementation complexity to an extent.

With reference to the first aspect, in a possible implementation of the first aspect, the frequency domain resource corresponding to the second synchronization signal is M resource units, and the frequency domain resource corresponding to the first synchronization signal is K*M resource units, where M is a positive integer, and K is an integer greater than 1, or K may be an integer greater than 1 or a decimal greater than 1.

The frequency domain resource corresponding to the second synchronization signal is enabled to be M resource units, and the frequency domain resource corresponding to the first synchronization signal is enabled to be K*M resource units, so that a sequence for generating the second synchronization signal may be a part of a sequence for generating the first synchronization signal, a sequence for generating the first synchronization signal may be obtained based on a sequence for generating the second synchronization signal, or the like, thereby reducing complexity of generating a synchronization signal.

With reference to the first aspect, in a possible implementation of the first aspect, the first synchronization signal is generated based on a first sequence, and the second synchronization signal is generated based on a second sequence.

In this embodiment, a synchronization signal may be generated by the network device based on a sequence. Alternatively, the first sequence and/or the second sequence may be specified in a protocol or in another manner, and the network device only needs to determine the first sequence and/or the second sequence without needing to generate the first sequence and/or the second sequence.

With reference to the first aspect, in a possible implementation of the first aspect, the first sequence is obtained based on the second sequence and a third sequence.

The first sequence may be obtained based on the second sequence and the third sequence. If the network device needs to generate the first sequence, the network device may generate the first sequence by learning of only the second sequence and the third sequence. This is relatively simple. Certainly, the first sequence may alternatively be specified in a protocol or in another manner, and the network device only needs to determine the first sequence without needing to generate the first sequence.

With reference to the first aspect, in a possible implementation of the first aspect, that the first sequence is obtained based on the second sequence and a third sequence includes at least one of the following:

the first sequence whose length is K*L is obtained based on a sequence whose length is K*N, and the sequence whose length is K*N is obtained based on the second sequence whose length is N and a fifth sequence whose length is K;

the first sequence whose length is K*L is obtained based on a fourth sequence whose length is L and a fifth sequence whose length is K, and the fourth sequence whose length is L is obtained based on the second sequence whose length is N;

the first sequence whose length is K*L is obtained based on a sequence whose length is H*N, and the sequence whose length is H*N is obtained based on the second sequence whose length is N and the third sequence whose length is H; or the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where the fifth sequence whose length is K is obtained based on the third sequence whose length is H, the fourth sequence whose length is L is obtained based on the second sequence whose length is N, and L is a quantity of subcarriers included in the M resource units.

There may be a plurality of manners in which the first sequence is obtained based on the second sequence and the third sequence, only several manners are enumerated herein, and no specific limitation is imposed. In addition, if the length of the third sequence, an arrangement order of sequence elements, and the like are properly available, the third sequence may be directly used as the fifth sequence. In this case, the network device does not need to perform the step of obtaining the fifth sequence based on the third sequence. Similarly, if the length of the second sequence, an arrangement order of sequence elements, and the like are properly available, the second sequence may be directly used as the fourth sequence. In this case, the network device does not need to perform the step of obtaining the fourth sequence based on the second sequence.

With reference to the first aspect, in a possible implementation of the first aspect, the first sequence whose length is K*L is obtained based on the fourth sequence whose length is L and the fifth sequence whose length is K, and the fourth sequence whose length is L is obtained based on the second sequence whose length is N, where the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, \ldots, a_0b_{K-1}, a_1b_{K-1}, a_2b_{K-1}, \ldots, a_{L-1}b_{K-1}\}$;

the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K}, 0 \leq i \leq K*L-1\}$, where mod is a modulo operator; or the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K}, 0 \leq i \leq K*L-1\}$ at equal intervals of a first length, where the first length and K*L are prime to each other.

Herein, only some examples of the fourth sequence and the fifth sequence are provided, and no specific limitation is imposed.

With reference to the first aspect, in a possible implementation of the first aspect, the first sequence whose length is K*L is obtained based on the sequence whose length is H*N, and the sequence whose length is H*N is obtained based on the second sequence whose length is N and the third sequence whose length is H, where the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2n_0, \ldots, m_{N-1}n_0, m_0n_1, m_1n_1, m_2n_1, \ldots, m_{N-1}n_1, \ldots, m_0n_{H-1}, m_1n_{H-1}, m_2n_{H-1}, \ldots, m_{N-1}n_{H-1}\}$, the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H}, 0 \leq i \leq H*N-1\}$, where mod is a modulo operator; or the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H}, 0 \leq i \leq H*N-1\}$ at equal intervals of a second length, where the second length and H*N are prime to each other, and mod is a modulo operator.

Herein, only some examples of the second sequence and the third sequence are provided, and no specific limitation is imposed.

With reference to the first aspect, in a possible implementation of the first aspect, the third sequence is an all-1 sequence or an orthogonal sequence.

The third sequence is an all-1 sequence or an orthogonal sequence, and generation of the first sequence is relatively simple. Certainly, that the third sequence may alternatively be another sequence is not limited in this embodiment.

With reference to the first aspect, in a possible implementation of the first aspect, the frequency domain resource corresponding to the second synchronization signal is M resource units, the frequency domain resource corresponding to the first synchronization signal is K*M resource units, both M and K are positive integers, the third sequence is an all-1 sequence, and the K*M resource units include K parts, where each part includes M resource units, and a sequence carried in each part is the same as a sequence carried in the M resource units corresponding to the second synchronization signal.

Correspondingly, the first sequence is a sequence obtained after "stretching" is performed on the second sequence. In this case, only the second sequence needs to be determined, and the first sequence may be obtained based on the second sequence and a simple all-1 sequence. This is relatively simple.

With reference to the first aspect, in a possible implementation of the first aspect, amplitude values of all elements included in the first sequence are the same, and the second sequence is a part of the first sequence.

Sequence elements having a constant amplitude value are used as elements of a sequence. This has an advantage that a sequence obtained after discrete Fourier transform (DFT) or inverse discrete Fourier transform (IDFT) is performed on the sequence has an ideal autocorrelation characteristic, thereby facilitating fast synchronization between the terminal device and the network device. In addition, because the second sequence is a part of the first sequence, a system does not need to separately design synchronization sequences for a broadband terminal device and a narrowband terminal device, thereby simplifying design on a system side.

With reference to the first aspect, in a possible implementation of the first aspect, the first sequence is an m-sequence.

The first sequence may be an m-sequence having a constant amplitude, or certainly may be another sequence.

According to a second aspect, a signal receiving method is provided. The method includes: receiving a first synchronization signal from a network device, where the first synchronization signal and a second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal; and performing synchronization with the network device based on the first synchronization signal, where the second synchronization signal is corresponding to the network device.

The method may be performed by a second communication apparatus. The second communication apparatus may be a terminal device or a communication apparatus that can support a terminal device in implementing a required function of the method. Certainly, the second communication apparatus may alternatively be another communication apparatus, for example, a chip system. Herein, an example in which the second communication apparatus is a terminal device is used.

With reference to the second aspect, in a possible implementation of the second aspect, the method further includes: receiving the second synchronization signal from the network device.

With reference to the second aspect, in a possible implementation of the second aspect, the frequency domain resource corresponding to the second synchronization signal is M resource units, and the frequency domain resource corresponding to the first synchronization signal is K*M resource units, where M is a positive integer, and K is an integer greater than 1; or the frequency domain resource corresponding to the first synchronization signal is M resource units, and the frequency domain resource corresponding to the second synchronization signal is K*M resource units, where M is a positive integer, and K is an integer greater than 1.

Optionally, K may be an integer greater than 1 or a decimal greater than 1.

With reference to the second aspect, in a possible implementation of the second aspect, the first synchronization signal is generated based on a first sequence, and the second synchronization signal is generated based on a second sequence; or the first synchronization signal is generated based on a second sequence, and the second synchronization signal is generated based on a first sequence.

With reference to the second aspect, in a possible implementation of the second aspect, the first sequence is obtained based on the second sequence and a third sequence.

With reference to the second aspect, in a possible implementation of the second aspect, that the first sequence is obtained based on the second sequence and a third sequence includes at least one of the following:

the first sequence whose length is K*L is obtained based on a sequence whose length is K*N, and the sequence whose length is K*N is obtained based on the second sequence whose length is N and a fifth sequence whose length is K;

the first sequence whose length is K*L is obtained based on a fourth sequence whose length is L and a fifth sequence whose length is K, and the fourth sequence whose length is L is obtained based on the second sequence whose length is N;

the first sequence whose length is K*L is obtained based on a sequence whose length is H*N, and the sequence whose length is H*N is obtained based on the second sequence whose length is N and the third sequence whose length is H; or the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where the fifth sequence whose length is K is obtained based on the third sequence whose length is H, the fourth sequence whose length is L is obtained based on the second sequence whose length is N, and L is a quantity of subcarriers included in the M resource units.

With reference to the second aspect, in a possible implementation of the second aspect, the first sequence whose length is K*L is obtained based on the fourth sequence whose length is L and the fifth sequence whose length is K, and the fourth sequence whose length is L is obtained based on the second sequence whose length is N, where the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0 b_0, a_1 b_0, a_2 b_0, \ldots, a_{L-1} b_0, a_0 b_1, a_1 b_1, a_2 b_1, \ldots, a_{L-1} b_1, \ldots, a_0 b_{K-1}, a_1 b_{K-1}, a_2 b_{K-1}, \ldots, a_{L-1} b_{K-1}\}$;

the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K} 0 \le i \le K*L-1\}$, where mod is a modulo operator; or the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K} 0 \le i \le K*L-1\}$ at equal intervals of a first length, where the first length and K*L are prime to each other.

With reference to the second aspect, in a possible implementation of the second aspect, the first sequence whose length is K*L is obtained based on the sequence whose length is H*N, and the sequence whose length is H*N is obtained based on the second sequence whose length is N and the third sequence whose length is H, where the second sequence is $\{m_0, m_1, \ldots, m_{N-1}\}$, the third sequence is $\{n_0, n_1, \ldots, n_{H-1}\}$, and the sequence whose length is H*N is $\{m_0 n_0, m_1 n_0, m_2 n_0, \ldots, m_{N-1} n_0, m_0 n_1, m_1 n_1, m_2 n_1, \ldots, m_{N-1} n_1, \ldots, m_0 n_{H-1}, m_1 n_{H-1}, m_2 n_{H-1}, \ldots, m_{N-1} n_{H-1}\}$;

the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H} 0 \le i \le H*N-1\}$, where mod is a modulo operator; or the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H} 0 \le i \le H*N-1\}$ at equal intervals of a second length, where the second length and H*N are prime to each other, and mod is a modulo operator.

With reference to the second aspect, in a possible implementation of the second aspect, the third sequence is an all-1 sequence or an orthogonal sequence.

With reference to the second aspect, in a possible implementation of the second aspect, the frequency domain resource corresponding to the second synchronization signal is M resource units, the frequency domain resource corresponding to the first synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the second synchronization signal; or the frequency domain resource corresponding to the first synchronization signal is M resource units, the frequency domain resource corresponding to the second synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the first synchronization signal.

With reference to the second aspect, in a possible implementation of the second aspect, amplitude values of all elements included in the first sequence are the same, and the second sequence is a part of the first sequence.

With reference to the second aspect, in a possible implementation of the second aspect, the first sequence is an m-sequence.

For technical effects achieved by the second aspect or the possible implementations of the second aspect, refer to the descriptions of the technical effects of the first aspect or the possible implementations of the first aspect.

According to a third aspect, a first type of communication apparatus is provided. For example, the communication apparatus is the foregoing first communication apparatus. The communication apparatus is configured to perform the method according to any one of the first aspect or the possible implementations of the first aspect. In an exemplary embodiment, the communication apparatus may include modules configured to perform the method according to any one of the first aspect or the possible implementations of the first aspect, for example, include a processing module and a transceiver module that are coupled to each other. For example, the communication apparatus is a network device.

The processing module is configured to generate synchronization signals, where the synchronization signals include a first synchronization signal and a second synchronization signal.

The transceiver module is configured to send the synchronization signals, where the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

With reference to the third aspect, in a possible implementation of the third aspect, the frequency domain resource corresponding to the second synchronization signal is M resource units, and the frequency domain resource corresponding to the first synchronization signal is K*M resource units, where M is a positive integer, and K is an integer greater than 1.

With reference to the third aspect, in a possible implementation of the third aspect, the first synchronization signal is generated based on a first sequence, and the second synchronization signal is generated based on a second sequence.

With reference to the third aspect, in a possible implementation of the third aspect, the first sequence is obtained based on the second sequence and a third sequence.

With reference to the third aspect, in a possible implementation of the third aspect, that the first sequence is obtained based on the second sequence and a third sequence includes at least one of the following:

the first sequence whose length is K*L is obtained based on a sequence whose length is K*N, and the sequence whose length is K*N is obtained based on the second sequence whose length is N and a fifth sequence whose length is K;

the first sequence whose length is K*L is obtained based on a fourth sequence whose length is L and a fifth sequence whose length is K, and the fourth sequence whose length is L is obtained based on the second sequence whose length is N;

the first sequence whose length is K*L is obtained based on a sequence whose length is H*N, and the sequence whose length is H*N is obtained based on the second sequence whose length is N and the third sequence whose length is H; or the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where the fifth sequence whose length is K is obtained based on the third sequence whose length is H, the fourth sequence whose length is L is obtained based on the second sequence whose length is N, and L is a quantity of subcarriers included in the M resource units.

With reference to the third aspect, in a possible implementation of the third aspect, the first sequence whose length is K*L is obtained based on the fourth sequence whose length is L and the fifth sequence whose length is K, and the fourth sequence whose length is L is obtained based on the second sequence whose length is N, where the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, \ldots, a_0b_{K-1}, a_1b_{K-1}, a_2b_{K-1}, \ldots, a_{L-1}b_{K-1}\}$;

the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K}, 0 \leq i \leq K*L-1\}$, where mod is a modulo operator; or the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K}, 0 \leq i \leq K*L-1\}$ at equal intervals of a first length, where the first length and K*L are prime to each other.

With reference to the third aspect, in a possible implementation of the third aspect, the first sequence whose length is K*L is obtained based on the sequence whose length is H*N, and the sequence whose length is H*N is obtained based on the second sequence whose length is N and the third sequence whose length is H, where the second sequence is $\{m_0, m_1, \ldots, m_{N-1}\}$, the third sequence is $\{n_0, n_1, \ldots, n_{H-1}\}$, and the sequence whose length is H*N is $\{m_0 n_0, m_1 n_0, m_2 n_0, \ldots, n_{N-1} n_0, m_0 n_1, m_1 n_1, m_2 n_1, \ldots, n_{N-1} n_1, \ldots, m_0 n_{H-1}, m_1 n_{H-1}, m_2 n_{H-1}, \ldots, m_{N-1} n_{H-1}\}$;

the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H} 0 \leq i \leq H*N-1\}$, where mod is a modulo operator; or the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H} 0 \leq i \leq H*N-1\}$ at equal intervals of a second length, where the second length and H*N are prime to each other, and mod is a modulo operator.

With reference to the third aspect, in a possible implementation of the third aspect, the third sequence is an all-1 sequence or an orthogonal sequence.

With reference to the third aspect, in a possible implementation of the third aspect, the frequency domain resource corresponding to the second synchronization signal is M resource units, the frequency domain resource corresponding to the first synchronization signal is K*M resource units, both M and K are positive integers, the third sequence is an all-1 sequence, and the K*M resource units include K parts, where each part includes M resource units, and a sequence carried in each part is the same as a sequence carried in the M resource units corresponding to the second synchronization signal.

With reference to the third aspect, in a possible implementation of the third aspect, amplitude values of all elements included in the first sequence are the same, and the second sequence is a part of the first sequence.

With reference to the third aspect, in a possible implementation of the third aspect, the first sequence is an m-sequence.

For technical effects achieved by the third aspect or the possible implementations of the third aspect, refer to the descriptions of the technical effects of the first aspect or the possible implementations of the first aspect.

According to a fourth aspect, a second type of communication apparatus is provided. For example, the communication apparatus is the foregoing second communication apparatus. The communication apparatus is configured to perform the method according to any one of the second aspect or the possible implementations of the second aspect. In an exemplary embodiment, the communication apparatus may include modules configured to perform the method according to any one of the second aspect or the possible implementations of the second aspect, for example, include a processing module and a transceiver module that are coupled to each other. For example, the communication apparatus is a terminal device.

The transceiver module is configured to receive a first synchronization signal from a network device, where the first synchronization signal and a second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

The processing module is configured to perform synchronization with the network device based on the first synchronization signal.

The second synchronization signal is corresponding to the network device.

With reference to the fourth aspect, in a possible implementation of the fourth aspect, the transceiver module is further configured to receive the second synchronization signal from the network device.

With reference to the fourth aspect, in a possible implementation of the fourth aspect, the frequency domain resource corresponding to the second synchronization signal is M resource units, and the frequency domain resource corresponding to the first synchronization signal is K*M resource units, where M is a positive integer, and K is an integer greater than 1; or the frequency domain resource corresponding to the first synchronization signal is M resource units, and the frequency domain resource corresponding to the second synchronization signal is K*M resource units, where M is a positive integer, and K is an integer greater than 1.

With reference to the fourth aspect, in a possible implementation of the fourth aspect, the first synchronization signal is generated based on a first sequence, and the second synchronization signal is generated based on a second sequence; or the first synchronization signal is generated based on a second sequence, and the second synchronization signal is generated based on a first sequence.

With reference to the fourth aspect, in a possible implementation of the fourth aspect, the first sequence is obtained based on the second sequence and a third sequence.

With reference to the fourth aspect, in a possible implementation of the fourth aspect, that the first sequence is obtained based on the second sequence and a third sequence includes at least one of the following:

the first sequence whose length is K*L is obtained based on a sequence whose length is K*N, and the sequence whose length is K*N is obtained based on the second sequence whose length is N and a fifth sequence whose length is K;

the first sequence whose length is K*L is obtained based on a fourth sequence whose length is L and a fifth sequence whose length is K, and the fourth sequence whose length is L is obtained based on the second sequence whose length is N;

the first sequence whose length is K*L is obtained based on a sequence whose length is H*N, and the sequence whose length is H*N is obtained based on the second sequence whose length is N and the third sequence whose length is H; or the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where the fifth sequence whose length is K is obtained based on the third sequence whose length is H, the fourth sequence whose length is L is obtained based on the second sequence whose length is N, and L is a quantity of subcarriers included in the M resource units.

With reference to the fourth aspect, in a possible implementation of the fourth aspect, the first sequence whose length is K*L is obtained based on the fourth sequence whose length is L and the fifth sequence whose length is K, and the fourth sequence whose length is L is obtained based on the second sequence whose length is N, where the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, a_0b_{K-1}, a_1b_{K-1}, a_2b_{K-1}, \ldots, a_{L-1}b_{K-1}\}$;

the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i\,mod\,L} b_{i\,mod\,K} 0 \leq i \leq K*L-1\}$, where mod is a modulo operator; or the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i\,mod\,L} b_{i\,mod\,K} 0 \leq i \leq K*L-1\}$ at equal intervals of a first length, where the first length and K*L are prime to each other.

With reference to the fourth aspect, in a possible implementation of the fourth aspect, the first sequence whose length is K*L is obtained based on the sequence whose length is H*N, and the sequence whose length is H*N is obtained based on the second sequence whose length is N and the third sequence whose length is H, where the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2n_0, \ldots, m_{N-1}n_0, m_0n_1, m_1n_1, m_2n_1, \ldots, m_{N-1}n_1, m_0n_{H-1}, m_1n_{H-1}, m_2n_{H-1}, \ldots, m_{N-1}n_{H-1}\}$;

the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i\,mod\,N} n_{i\,mod\,H} 0 \leq i \leq H*N-1\}$, where mod is a modulo operator; or the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i\,mod\,N} n_{i\,mod\,H} 0 \leq i \leq H*N-1\}$ at equal intervals of a second length, where the second length and H*N are prime to each other, and mod is a modulo operator.

With reference to the fourth aspect, in a possible implementation of the fourth aspect, the third sequence is an all-1 sequence or an orthogonal sequence.

With reference to the fourth aspect, in a possible implementation of the fourth aspect, the frequency domain resource corresponding to the second synchronization signal is M resource units, the frequency domain resource corresponding to the first synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the second synchronization signal; or the frequency domain resource corresponding to the first synchronization signal is M resource units, the frequency domain resource corresponding to the second synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the first synchronization signal.

With reference to the fourth aspect, in a possible implementation of the fourth aspect, amplitude values of all elements included in the first sequence are the same, and the second sequence is a part of the first sequence.

With reference to the fourth aspect, in a possible implementation of the fourth aspect, the first sequence is an m-sequence.

For technical effects achieved by the fourth aspect or the possible implementations of the fourth aspect, refer to the descriptions of the technical effects of the second aspect or the possible implementations of the second aspect.

According to a fifth aspect, a third type of communication apparatus is provided. The communication apparatus is, for example, the foregoing first communication apparatus. The communication apparatus includes a processor and a transceiver, configured to implement the method according to any one of the first aspect or the possible implementations of the first aspect. For example, the communication apparatus is a chip disposed in a communication device. For example, the communication device is a network device. For example, the transceiver is implemented by using an antenna, a feeder, and a codec in the communication device. Alternatively, if the communication apparatus is a chip disposed in a communication device, the transceiver is, for example, a communication interface in the chip. The communication interface is connected to a radio frequency transceiver component in the communication device, to receive and send information by using the radio frequency transceiver component.

The processor is configured to generate synchronization signals, where the synchronization signals include a first synchronization signal and a second synchronization signal.

The transceiver is configured to send the synchronization signals, where the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

With reference to the fifth aspect, in a possible implementation of the fifth aspect, the frequency domain resource corresponding to the second synchronization signal is M resource units, and the frequency domain resource corresponding to the first synchronization signal is K*M resource units, where M is a positive integer, and K is an integer greater than 1.

With reference to the fifth aspect, in a possible implementation of the fifth aspect, the first synchronization signal is generated based on a first sequence, and the second synchronization signal is generated based on a second sequence.

With reference to the fifth aspect, in a possible implementation of the fifth aspect, the first sequence is obtained based on the second sequence and a third sequence.

With reference to the fifth aspect, in a possible implementation of the fifth aspect, that the first sequence is obtained based on the second sequence and a third sequence includes at least one of the following:

the first sequence whose length is K*L is obtained based on a sequence whose length is K*N, and the sequence whose length is K*N is obtained based on the second sequence whose length is N and a fifth sequence whose length is K;

the first sequence whose length is K*L is obtained based on a fourth sequence whose length is L and a fifth sequence whose length is K, and the fourth sequence whose length is L is obtained based on the second sequence whose length is N;

the first sequence whose length is K*L is obtained based on a sequence whose length is H*N, and the sequence whose length is H*N is obtained based on the second sequence whose length is N and the third sequence whose length is H; or the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where the fifth sequence whose length is K is obtained based on the third sequence whose length is H, the fourth sequence whose length is L is obtained based on the second sequence whose length is N, and L is a quantity of subcarriers included in the M resource units.

With reference to the fifth aspect, in a possible implementation of the fifth aspect, the first sequence whose length is K*L is obtained based on the fourth sequence whose length is L and the fifth sequence whose length is K, and the fourth sequence whose length is L is obtained based on the second sequence whose length is N, where the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, \ldots, a_0b_{K-1}, a_1b_{K-1}, a_2b_{K-1}, \ldots, a_{L-1}b_{K-1}\}$;

the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K}, 0 \leq i \leq K*L-1\}$, where mod is a modulo operator; or the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K}, 0 \leq i \leq K*L-1\}$, at equal intervals of a first length, where the first length and K*L are prime to each other.

With reference to the fifth aspect, in a possible implementation of the fifth aspect, the first sequence whose length is K*L is obtained based on the sequence whose length is H*N, and the sequence whose length is H*N is obtained based on the second sequence whose length is N and the third sequence whose length is H, where the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2n_0, \ldots, m_{N-1}n_0, m_0n_1, m_1n_1, m_2n_1, \ldots, m_{N-1}n_1, \ldots, m_0n_{H-1}, m_1n_{H-1}, m_2n_{H-1}, \ldots, m_{N-1}n_{H-1}\}$;

the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H}, 0 \leq i \leq H*N-1\}$, where mod is a modulo operator; or the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H}, 0 \leq i \leq H*N-1\}$ at equal intervals of a second length, where the second length and H*N are prime to each other, and mod is a modulo operator.

With reference to the fifth aspect, in a possible implementation of the fifth aspect, the third sequence is an all-1 sequence or an orthogonal sequence.

With reference to the fifth aspect, in a possible implementation of the fifth aspect, the frequency domain resource corresponding to the second synchronization signal is M resource units, the frequency domain resource corresponding to the first synchronization signal is K*M resource units, both M and K are positive integers, the third sequence is an all-1 sequence, and the K*M resource units include K parts, where each part includes M resource units, and a sequence carried in each part is the same as a sequence carried in the M resource units corresponding to the second synchronization signal.

With reference to the fifth aspect, in a possible implementation of the fifth aspect, amplitude values of all elements included in the first sequence are the same, and the second sequence is a part of the first sequence.

With reference to the fifth aspect, in a possible implementation of the fifth aspect, the first sequence is an m-sequence.

For technical effects achieved by the fifth aspect or the possible implementations of the fifth aspect, refer to the descriptions of the technical effects of the first aspect or the possible implementations of the first aspect.

According to a sixth aspect, a fourth type of communication apparatus is provided. The communication apparatus is, for example, the foregoing second communication apparatus. The communication apparatus includes a processor and a transceiver, configured to implement the method according to any one of the second aspect or the possible implementations of the second aspect. For example, the communication apparatus is a chip disposed in a communication device. For example, the communication device is a terminal device. For example, the transceiver is implemented by using an antenna, a feeder, and a codec in the communication device. Alternatively, if the communication apparatus is a chip disposed in a communication device, the transceiver is, for example, a communication interface in the chip. The communication interface is connected to a radio frequency transceiver component in the communication device, to receive and send information by using the radio frequency transceiver component.

The transceiver is configured to receive a first synchronization signal from a network device, where the first synchronization signal and a second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

The processor is configured to perform synchronization with the network device based on the first synchronization signal.

The second synchronization signal is corresponding to the network device.

With reference to the sixth aspect, in a possible implementation of the sixth aspect, the transceiver is further configured to receive the second synchronization signal from the network device.

With reference to the sixth aspect, in a possible implementation of the sixth aspect, the frequency domain resource corresponding to the second synchronization signal is M resource units, and the frequency domain resource corresponding to the first synchronization signal is K*M resource units, where M is a positive integer, and K is an integer greater than 1; or the frequency domain resource corresponding to the first synchronization signal is M resource units, and the frequency domain resource corresponding to the second synchronization signal is K*M resource units, where M is a positive integer, and K is an integer greater than 1.

With reference to the sixth aspect, in a possible implementation of the sixth aspect,
the first synchronization signal is generated based on a first sequence, and the second synchronization signal is generated based on a second sequence; or
the first synchronization signal is generated based on a second sequence, and the second synchronization signal is generated based on a first sequence.

With reference to the sixth aspect, in a possible implementation of the sixth aspect, the first sequence is obtained based on the second sequence and a third sequence.

With reference to the sixth aspect, in a possible implementation of the sixth aspect, that the first sequence is obtained based on the second sequence and a third sequence includes at least one of the following:
the first sequence whose length is K*L is obtained based on a sequence whose length is K*N, and the sequence whose length is K*N is obtained based on the second sequence whose length is N and a fifth sequence whose length is K;
the first sequence whose length is K*L is obtained based on a fourth sequence whose length is L and a fifth sequence whose length is K, and the fourth sequence whose length is L is obtained based on the second sequence whose length is N;
the first sequence whose length is K*L is obtained based on a sequence whose length is H*N, and the sequence whose length is H*N is obtained based on the second sequence whose length is N and the third sequence whose length is H; or
the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where
the fifth sequence whose length is K is obtained based on the third sequence whose length is H, the fourth sequence whose length is L is obtained based on the second sequence whose length is N, and L is a quantity of subcarriers included in the M resource units.

With reference to the sixth aspect, in a possible implementation of the sixth aspect, the first sequence whose length is K*L is obtained based on the fourth sequence whose length is L and the fifth sequence whose length is K, and the fourth sequence whose length is L is obtained based on the second sequence whose length is N, where
the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, \ldots, a_0b_{K-1}, a_1b_{K-1}, a_2b_{K-1}, \ldots, a_{L-1}b_{K-1}\}$;
the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K} 0 \leq i \leq K*L-1\}$, where mod is a modulo operator; or
the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K} 0 \leq i \leq K*L-1\}$ at equal intervals of a first length, where the first length and K*L are prime to each other.

With reference to the sixth aspect, in a possible implementation of the sixth aspect, the first sequence whose length is K*L is obtained based on the sequence whose length is H*N, and the sequence whose length is H*N is obtained based on the second sequence whose length is N and the third sequence whose length is H, where
the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2n_0, \ldots, m_{N-1}n_0, m_0n_1, m_1n_1, m_2n_1, \ldots, m_{N-1}n_1, \ldots, m_0n_{H-1}, m_1n_{H-1}, m_2n_{H-1}, \ldots, m_{N-1}n_{H-1}\}$;
the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H} 0 \leq i \leq H*N-1\}$, where mod is a modulo operator; or
the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H} 0 \leq i \leq H*N-1\}$ at equal intervals of a second length, where the second length and H*N are prime to each other, and mod is a modulo operator.

With reference to the sixth aspect, in a possible implementation of the sixth aspect, the third sequence is an all-1 sequence or an orthogonal sequence.

With reference to the sixth aspect, in a possible implementation of the sixth aspect,
the frequency domain resource corresponding to the second synchronization signal is M resource units, the frequency domain resource corresponding to the first synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the second synchronization signal; or
the frequency domain resource corresponding to the first synchronization signal is M resource units, the frequency domain resource corresponding to the second synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the first synchronization signal.

With reference to the sixth aspect, in a possible implementation of the sixth aspect, amplitude values of all elements included in the first sequence are the same, and second sequence is a part of the first sequence.

With reference to the sixth aspect, in a possible implementation of the sixth aspect, the first sequence is an m-sequence.

For technical effects achieved by the sixth aspect or the possible implementations of the sixth aspect, refer to the descriptions of the technical effects of the second aspect or the possible implementations of the second aspect.

According to a seventh aspect, a fifth type of communication apparatus is provided. The communication apparatus may be the first communication apparatus in the foregoing method implementations. For example, the communication apparatus is a chip disposed in a network device. The communication apparatus includes: a memory, configured to store computer-executable program code; and a processor, where the processor is coupled to the memory. The program code stored in the memory includes instructions. When the processor executes the instructions, the fifth type of communication apparatus is enabled to perform the method according to any one of the first aspect or the possible implementations of the first aspect.

The fifth type of communication apparatus may further include a communication interface. The communication interface may be a transceiver in the network device, and is implemented by using, for example, an antenna, a feeder, and a codec in the communication apparatus. Alternatively, if the fifth type of communication apparatus is a chip disposed in the network device, the communication interface may be an input/output interface of the chip, for example, an input/output pin.

According to an eighth aspect, a sixth type of communication apparatus is provided. The communication apparatus may be the second communication apparatus in the foregoing method implementations. For example, the communication apparatus is a chip disposed in a terminal device. The communication apparatus includes: a memory, configured to store computer-executable program code; and a processor, where the processor is coupled to the memory. The program code stored in the memory includes instructions. When the processor executes the instructions, the sixth type of communication apparatus is enabled to perform the method according to any one of the second aspect or the possible implementations of the second aspect.

The sixth type of communication apparatus may further include a communication interface. The communication interface may be a transceiver in the terminal device, and is implemented by using, for example, an antenna, a feeder, and a codec in the communication apparatus. Alternatively, if the sixth type of communication apparatus is a chip disposed in the terminal device, the communication interface may be an input/output interface of the chip, for example, an input/output pin.

According to a ninth aspect, a communication system is provided. The communication system may include the first type of communication apparatus according to the third aspect, the third type of communication apparatus according to the fifth aspect, or the fifth type of communication apparatus according to the seventh aspect, and include the second type of communication apparatus according to the fourth aspect, the fourth type of communication apparatus according to the sixth aspect, or the sixth type of communication apparatus according to the eighth aspect.

According to a tenth aspect, a computer-readable storage medium is provided. The computer-readable storage medium stores instructions. When the instructions are run on a computer, the computer is enabled to perform the method according to any one of the first aspect or the possible implementations of the first aspect.

According to an eleventh aspect, a computer-readable storage medium is provided. The computer-readable storage medium stores instructions. When the instructions are run on a computer, the computer is enabled to perform the method according to any one of the second aspect or the possible implementations of the second aspect.

According to a twelfth aspect, a computer program product including instructions is provided. The computer program product stores the instructions. When the computer program product is run on a computer, the computer is enabled to perform the method according to any one of the first aspect or the possible implementations of the first aspect.

According to a thirteenth aspect, a computer program product including instructions is provided. The computer program product stores the instructions. When the computer program product is run on a computer, the computer is enabled to perform the method according to any one of the second aspect or the possible implementations of the second aspect.

In the embodiments, the two synchronization signals are enabled to be not completely independent, but partially overlap in frequency domain. In this way, frequency domain resources occupied by the synchronization signals may be reduced, thereby saving frequency domain resources for another data transmission process. In addition, the two synchronization signals may further share a part of the frequency domain resources, thereby improving resource utilization.

DESCRIPTION OF EMBODIMENTS

Figure 1:
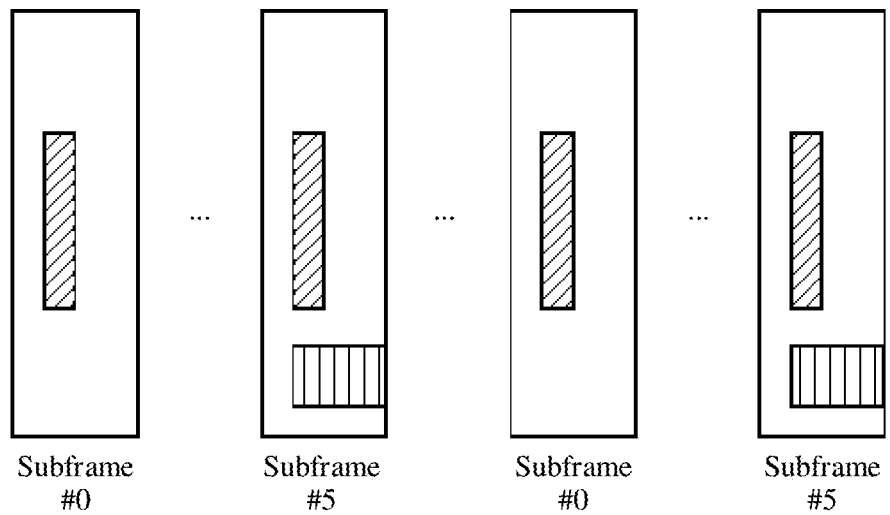
FIG. 1 is a method for designing synchronization channels in in-band deployment of an LTE system and an NB-IoT system.

To make objectives, technical solutions and advantages of the exemplary embodiments clearer, the following further describes the embodiments in detail with reference to the accompanying drawings.

The following describes some terms in the embodiments, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network, and exchange voice and/or data with the radio access network. The terminal device may include user equipment, a wireless terminal device, a mobile terminal device, a device-to-device communication terminal device, a vehicle to everything (V2X) terminal device, a machine-to-machine/machine-type communications (M2M/MTC) terminal device, an internet of things (IoT) terminal device, a subscriber unit, a subscriber station, a mobile station, a remote station, an access point, a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, or the like. For example, the terminal device is a device such as a personal communications service phone, a cordless phone, a session initiation protocol phone, a wireless local loop station, or a personal digital assistant (PDA). The terminal device further includes a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, but not limitation, the terminal device in the embodiments may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of the user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the various terminal devices described above are located on a vehicle (for example, placed in the vehicle or installed in the vehicle), the terminal devices may be considered as vehicle-mounted terminal devices. For example, the vehicle-mounted terminal devices are also referred to as on-board units.

In the embodiments, the terminal device may further include a relay. Alternatively, it may be understood that any device that can perform data communication with a base station may be considered as a terminal device.

Two types of terminal devices, a broadband terminal device and a narrowband terminal device, are used in the embodiments. Conditions that the broadband terminal device and the narrowband terminal device need to satisfy include but are not limited to the following:

(1) In the embodiments, a maximum bandwidth capability of the narrowband terminal device is less than or equal to a minimum bandwidth capability of the broadband terminal device. For example, the narrowband terminal device is an NB-IoT terminal device, and the broadband terminal device is an LTE terminal device. A data transmission bandwidth of the NB-IoT terminal device is one RB, namely, 180 kHz or 200 kHz (including a guard band). Because a frequency domain resource occupied by a primary synchronization signal/secondary synchronization signal of an LTE system is six RBs, namely, 1.08 MHz or 1.44 MHz (including a guard band), the minimum bandwidth capability of the broadband terminal device may be considered as not less than 1.08 MHz. In this case, it may be considered that the maximum bandwidth capability of the narrowband terminal device is less than or equal to the minimum bandwidth capability of the broadband terminal device. For another example, the narrowband terminal device is an NB-IoT terminal device, and the broadband terminal device is an NR terminal device. Based on an implementation of a synchronization signal block of an NR system, a minimum bandwidth capability of the NR terminal device may be considered as 20 RBs, where each RB includes 12 subcarriers. In the NR system, a subcarrier spacing is related to a frequency band deployed in the NR system, and is not a fixed value. Using a minimum subcarrier spacing of 15 kHz as an example, the minimum bandwidth capability may be considered to be greater than or equal to 20*12*15=3.6 MHz. It may still be considered that the maximum bandwidth capability of the narrowband terminal device is less than or equal to the minimum bandwidth capability of the broadband terminal device.

(2) In the embodiments, it may alternatively be considered that a minimum bandwidth capability of the narrowband terminal device is less than a minimum bandwidth capability of the broadband terminal device. If a data transmission channel is established between a terminal device and a network device, generally, the terminal device needs to first receive a synchronization channel and a broadcast channel that are sent by the network device. Therefore, it may be considered that a bandwidth corresponding to the synchronization channel and the broadcast channel that are sent by the network device is a minimum bandwidth capability that the terminal device needs to have.

Based on (1) and (2), the narrowband terminal device may also be considered as a bandwidth limited terminal device. It should be noted that the bandwidth limited terminal device may also have another bandwidth feature other than those in (1) and (2). This is not specifically limited.

(3) In the embodiments, it may alternatively be considered that the narrowband terminal device needs to maintain normal data communication with a network device by using a coverage enhancement technology, but the broadband terminal device may maintain normal data communication with the network device even without using the coverage enhancement technology. The coverage enhancement technology includes but is not limited to a technology such as repeated data transmission or power boost. Alternatively, if both the broadband terminal device and the narrowband terminal device need to maintain normal data communication with the network device through repeated data transmission in some scenarios, a maximum quantity of repetition times required by the narrowband terminal device to maintain data communication with the network device is less than a maximum quantity of repetition times required by the broadband terminal device to maintain data communication with the network device.

(4) In the embodiments, the narrowband terminal device may alternatively be considered as a low power wide coverage access terminal device, and the broadband terminal device may be considered as an enhanced mobile broadband (eMBB) terminal device or an ultra-reliable low-latency communication terminal device.

(2) A network device includes, for example, an access network device such as a base station (for example, an access point), and may be a device that is in an access network and that communicates with a wireless terminal device over an air interface by using one or more cells. Alternatively, for example, a network device in a V2X technology is a road side unit. The base station may be configured to mutually convert a received over-the-air frame and a received Internet protocol (IP) packet, and serve as a router between the terminal device and the other parts of the access network, where the other parts of the access network may include an IP network. The roadside unit may be a fixed infrastructure entity supporting application of the V2X and may exchange a message with another entity supporting application of the V2X. The network device may further coordinate attribute management of the air interface. For example, the network device may include an evolved NodeB (NodeB, eNB, e-NodeB, or evolutional Node B) in an LTE system or a long term evolution-advanced (LTE-A) system, may include a next generation NodeB (gNB) in a 5G NR system, or may include a centralized unit and a distributed unit in a cloud radio access network (Cloud RAN) system. This is not limited in the embodiments.

(3) In the embodiments, the mentioned cell may be a cell corresponding to a base station, and the cell may belong to a macro base station, or may belong to a base station corresponding to a small cell. The small cell herein may include: a metro cell, a micro cell, a pico cell, a femto cell, and the like. These small cells have characteristics of small coverage and low transmit power, and are applicable to providing a high-speed data transmission service.

On a carrier in an LTE system or an NR system, a plurality of cells may work at a same frequency at the same time. In some special scenarios, it may be considered that a concept of the carrier is equivalent to a concept of the cell. For example, in a carrier aggregation scenario, when a secondary carrier is configured for the terminal device, both a carrier index of the secondary carrier and a cell identity of a secondary cell working on the secondary carrier are carried. In this case, it may be considered that the concept of the carrier is equivalent to the concept of the cell. For example, that the terminal device accesses a carrier is equivalent to that the terminal device accesses a cell. Similar descriptions are also provided for a dual connectivity scenario. In the embodiments, the concept of the cell is used for description. In an NR system, if one cell or one carrier has only one active bandwidth part, it may also be considered that a concept of the cell is equivalent to that of the bandwidth part.

(4) The terms "system" and "network" may be used interchangeably in the embodiments. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments are used to distinguish between a plurality of objects, but are not intended to limit a sequence, a time sequence, priorities, or importance of the plurality of objects. For example, a first synchronization signal and a second synchronization signal are merely intended to distinguish between different synchronization signals, but do not indicate that the two synchronization signals are different in content, a priority, a sending sequence, importance, or the like.

The foregoing describes some concepts in the embodiments. The following describes technical features in the embodiments.

A 5th generation (5G) NR system is a global 5G standard for a brand-new air interface design based on orthogonal frequency division multiplexing (OFDM) and is also a basis for a next generation of very important cellular mobility technology. Services of the 5G technology are very diverse, and may be oriented to eMBB, ultra-reliable low-latency communication, and massive machine-type communication (mMTC).

The diversified services of the NR system require that the NR system is designed to satisfy access requirements of terminal devices having different bandwidth capabilities. For example, an eMBB terminal device may access the NR system by obtaining broadband information of the NR system, and some mMTC terminal devices may access the NR system by obtaining narrowband information of the NR system due to consideration of design costs, low power consumption, and other aspects. For another example, even for a same service type such as mMTC, there are also different service rate requirements. For example, for use cases such as meter reading, tracing, or on-demand payment, such a terminal device has a low requirement on a data transmission rate, but usually requires deep coverage, and may usually perform access through narrowband. In addition, for example, surveillance video backhaul has a relatively high requirement on a data transmission rate. Therefore, such a terminal device can be considered as a terminal device having a mid- or high-end capability, and may usually perform access through broadband.

Generally, when accessing a wireless communication system such as an LTE system or an NR system, a terminal device first needs to implement synchronization with a network device in the wireless communication system. For example, the terminal device first obtains synchronization information of the network device by detecting a synchronization channel, where the synchronization information may include time synchronization information and/or frequency synchronization information and may further obtain information about a cell managed by the network device. In this way, normal data communication between the terminal device and the network device can be ensured subsequently.

The LTE system can serve both an eMBB service and an NB-IoT service. NB-IoT is built on a cellular network, consumes a bandwidth of only about 180 kHz, and may be directly deployed on an LTE network to reduce deployment costs.

An in-band deployment NB-IoT of the LTE network is used as an example. A non-NB-IoT terminal device, for example, a terminal device of an eMBB service, may access the LTE system by using a synchronization channel whose frequency domain bandwidth is six RBs. In addition, an NB-IoT terminal device accesses an NB-IoT system by using a synchronization channel whose frequency domain bandwidth is one RB (namely, 180 kHz). Synchronization channels that serve different types of terminal devices are independently designed. FIG. 1 is a method for designing synchronization channels in in-band deployment of an LTE system and an NB-IoT system. A subframe #0 and a subframe #5 respectively represent the first subframe and the sixth subframe in a radio frame, a box with slashes represents a synchronization signal designed for the non-NB-IoT terminal device, and a box with vertical lines represents a synchronization signal designed for the NB-IoT terminal device.

Resources allocated to the synchronization channels cannot be reused for another data transmission process. Therefore, in a current synchronization channel design manner, resource utilization efficiency is reduced. In addition, the current design of the synchronizing channels that are independent of each other brings additional implementation complexity.

In view of this, the technical solutions in the embodiments are provided. In the embodiments, within a time domain resource in which a first synchronization signal and a second synchronization signal overlap, there is an intersection set between a frequency domain resource corresponding to the first synchronization signal and a frequency domain resource corresponding to the second synchronization signal. This is equivalent to that the two synchronization signals are enabled to be not completely independent, but partially overlap in frequency domain. In this way, frequency domain resources occupied by the synchronization signals may be reduced, thereby saving frequency domain resources for another data transmission process. In addition, the two synchronization signals may further share a part of the frequency domain resources, thereby improving resource utilization. In addition, different synchronization channels are enabled to be not completely independent, but partially overlap, to reduce implementation complexity to an extent.

The technical solutions provided in the embodiments may be applied to a wireless communication system, including a 4.5G or 5G wireless communication system, a further-evolved system based on LTE or NR, and a future wireless communication system.

An application scenario in the embodiments may be a wireless communication system that can serve terminal devices having different bandwidth capabilities, for example, an LTE system or an NR system that can serve both an NB-IoT terminal device and an eMBB terminal device.

Figure 2:
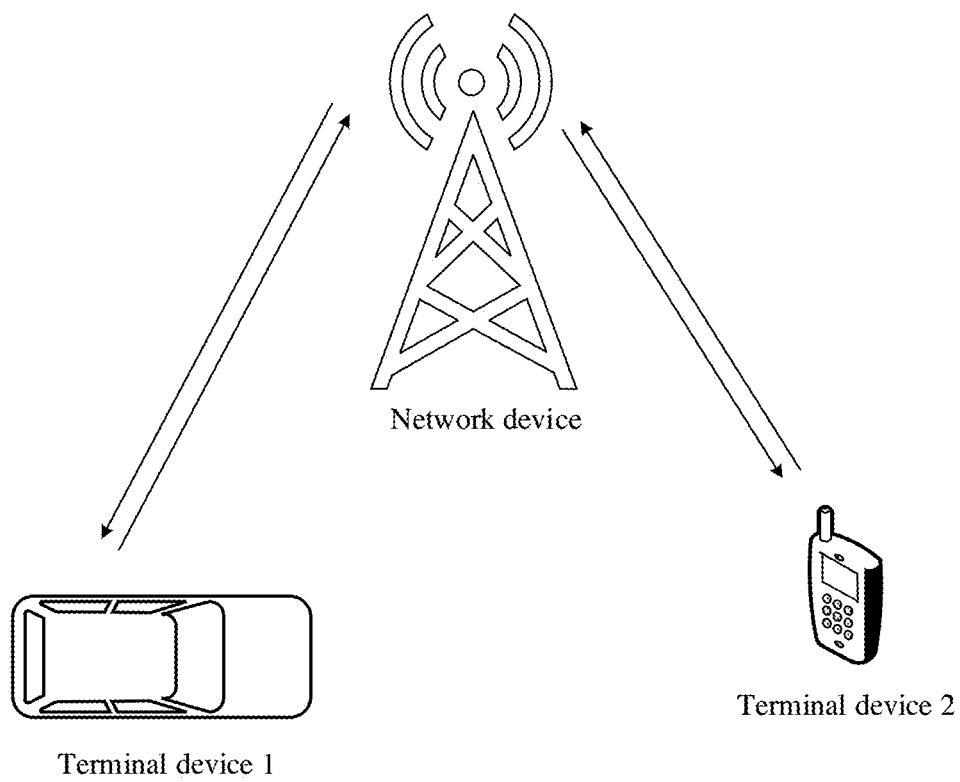
FIG. 2 is a schematic diagram of an application scenario according to an embodiment.

The following describes a network architecture used in the embodiments. FIG. 2 shows a network architecture used in an embodiment.

FIG. 2 includes a network device and two terminal devices, which are respectively a terminal device 1 and a terminal device 2. Both the two terminal devices may be connected to the network device. For example, the terminal device 1 is a terminal device supporting a broadband synchronization channel, and is, for example, a non-NB-IoT terminal device. The terminal device 2 is a terminal device supporting a narrowband synchronization channel, and is, for example, an NB-IoT terminal device. Certainly, a quantity of terminal devices in FIG. 2 is merely an example. During actual application, the network device may provide services for a plurality of terminal devices.

The network device in FIG. 2 is, for example, an access network device such as a base station. The access network device is corresponding to different devices in different systems. For example, the access network device may be corresponding to an eNB in a 4th generation mobile communication technology (4G) system, and corresponding to a 5G access network device, such as a gNB, in a 5G system.

For example, in FIG. 2, the NB-IoT terminal device is a vehicle-mounted terminal device or a vehicle, and the non-NB-IoT terminal device is a mobile phone. However, the terminal device in the embodiments is not limited thereto.

With reference to the accompanying drawings, the following describes the technical solutions provided in the embodiments.

Figure 3:
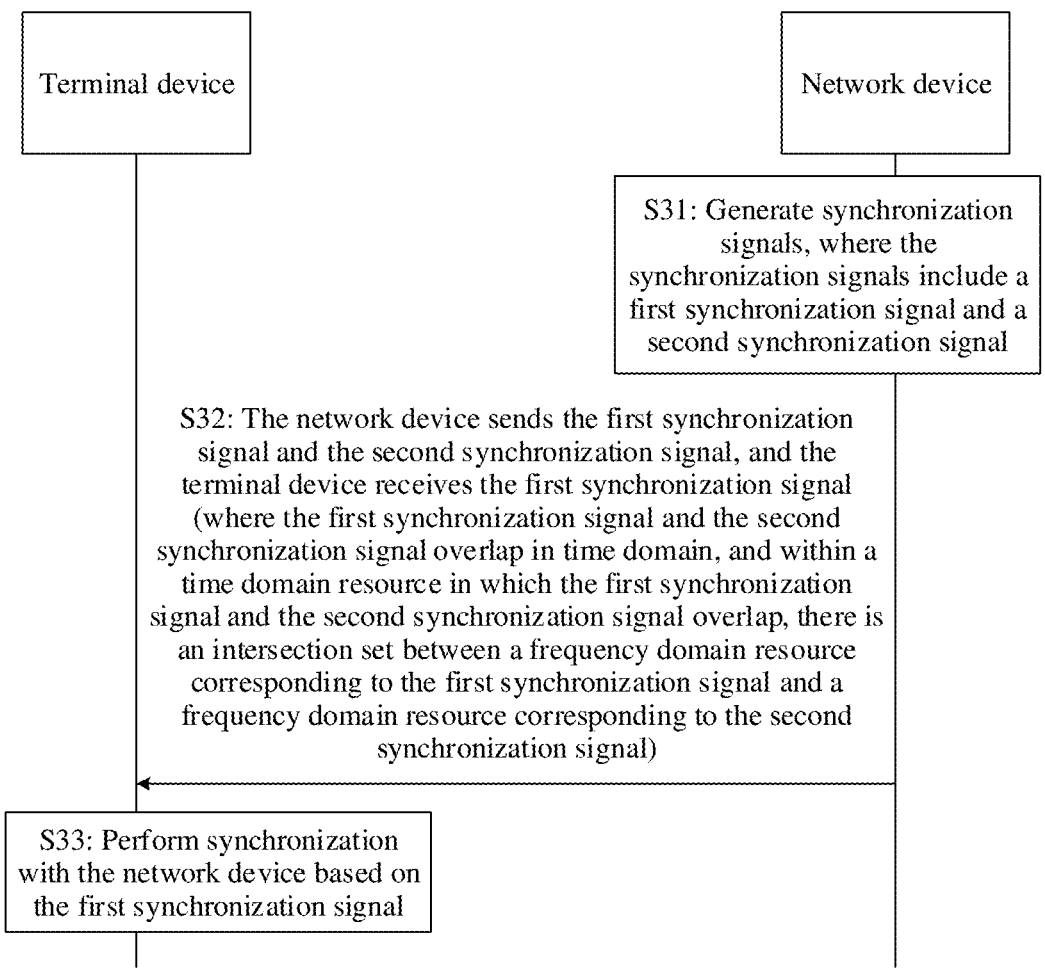
FIG. 3 is a flowchart of a signal sending and receiving method according to an embodiment.

An embodiment provides a signal sending and receiving method. FIG. 3 is a flowchart of the method. In the following description process, an example in which the method is used for the network architecture shown in FIG. 2 is used. In addition, the method may be performed by two communication apparatuses. The two communication apparatuses are, for example, a first communication apparatus and a second communication apparatus. The first communication apparatus may be a network device or a communication apparatus that can support a network device in implementing a required function of the method, or may be a terminal device or a communication apparatus that can support a terminal device in implementing a required function of the method. Certainly, the first communication apparatus may alternatively be another communication apparatus, for example, a chip system. The second communication apparatus may be a network device or a communication apparatus that can support a network device in implementing a required function of the method, or may be a terminal device or a communication apparatus that can support a terminal device in implementing a required function of the method. Certainly, the second communication apparatus may alternatively be another communication apparatus, for example, a chip system. In addition, implementations of the first communication apparatus and the second communication apparatus are not limited. For example, the first communication apparatus may be a network device, and the second communication apparatus is a terminal device; the first communication apparatus is a network device, and the second communication apparatus is a communication apparatus that can support a terminal device in implementing a required function of the method; or the first communication apparatus is a communication apparatus that can support a network device in implementing a required function of the method, and the second communication apparatus is a communication apparatus that can support a terminal device in implementing a required function of the method. For example, the network device is a base station.

For ease of description, the following uses an example in which the method is performed by a network device and a terminal device, that is, an example in which the first communication apparatus is a network device and the second communication apparatus is a terminal device. For example, this embodiment is applied to the network architecture shown in FIG. 2. Therefore, in the following descriptions, a network device may be the network device in the network architecture shown in FIG. 2, and a terminal device may be the terminal device 1 or the terminal device 2 in the network architecture shown in FIG. 2.

Referring to FIG. 3, in step S31 the network device generates synchronization signals, where the synchronization signals include a first synchronization signal and a second synchronization signal.

It should be noted that the synchronization signal may be considered as a signal carried on a synchronization channel for transmission. Based on this, in the embodiments, the synchronization signal and the synchronization channel are interchangeable. That is, descriptions of the synchronization signal and descriptions of the synchronization channel may be replaced by each other.

If the terminal device is a narrowband terminal device, the terminal device may receive only a narrowband synchronization signal but is not capable of receiving a broadband synchronization signal. In this case, the first synchronization signal may be a narrowband synchronization signal, the second synchronization signal is a broadband synchronization signal, and the terminal device receives only the first synchronization signal. Alternatively, if the terminal device is a broadband terminal device, the terminal device may receive only a broadband synchronization signal, or may receive a broadband synchronization signal and a narrowband synchronization signal. In this case, the terminal device may further receive the second synchronization signal from the network device. In addition, in this case, the first synchronization signal may be a narrowband synchronization signal, and the second synchronization signal is a broadband synchronization signal; or the first synchronization signal may be a broadband synchronization signal, and the second synchronization signal is a narrowband synchronization signal. A frequency domain resource corresponding to a broadband synchronization signal is larger than a frequency domain resource corresponding to a narrowband synchronization signal.

In this embodiment, the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal. A sending periodicity of the first synchronization signal may be the same as a sending periodicity of the second synchronization signal. Alternatively, considering that the narrowband terminal device may need to improve coverage through a plurality of times of repeated sending, a sending periodicity of the narrowband synchronization signal may be relatively short, and a sending periodicity of the broadband synchronization signal may be relatively long. Therefore, sending periodicities of the two synchronization signals may be different.

Figure 4A:
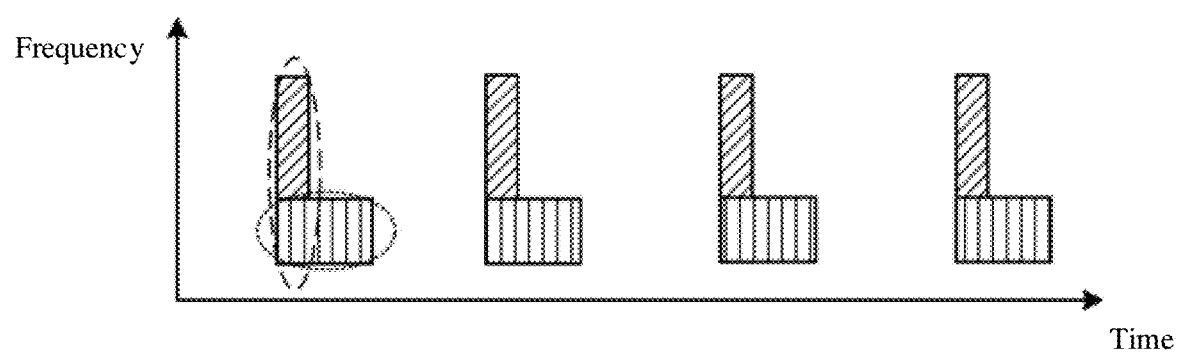
FIG. 4A and FIG. 4B are schematic diagrams of two cases in which a first synchronization signal and a second synchronization signal overlap in time domain according to an embodiment.

If the sending periodicity of the first synchronization signal is the same as the sending periodicity of the second synchronization signal, the first synchronization signal and the second synchronization signal overlap in time domain in each sending periodicity. Referring to FIG. 4A, a box with slashes represents the first synchronization signal, and a box with vertical lines represents the second synchronization signal; or a box with slashes represents the second synchronization signal, and a box with vertical lines represents the first synchronization signal. It may be learned that sending periodicities of the two synchronization signals are the same. In each sending periodicity, the two synchronization signals overlap in time domain. However, because time domain lengths of the two synchronization signals are different, the two synchronization signals may not completely overlap in time domain in each sending periodicity.

Figure 4B:
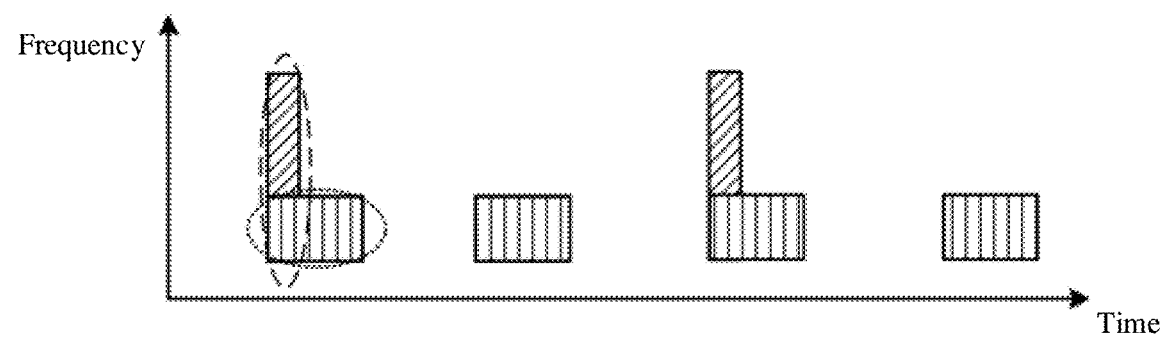

Alternatively, if the sending periodicity of the first synchronization signal is different from the sending periodicity of the second synchronization signal, the first synchronization signal and the second synchronization signal may overlap in time domain in only some sending periodicities. Referring to FIG. 4B, a box with slashes represents the first synchronization signal, and a box with vertical lines represents the second synchronization signal; or a box with slashes represents the second synchronization signal, and a box with vertical lines represents the first synchronization signal. It can be learned that sending periodicities of the two synchronization signals are different, and the sending periodicity of the broadband synchronization signal is shorter than the sending periodicity of the narrowband synchronization signal. In this case, the two synchronization signals do not overlap in time domain in each sending periodicity, but may overlap in time domain in only some sending periodicities. In FIG. 4B, as long as both the first synchronization signal and the second synchronization signal are sent in a sending periodicity, the two synchronization signals overlap in time domain. It is also possible that even if both the first synchronization signal and the second synchronization signal are sent in one sending periodicity, the two synchronization signals may not completely overlap in time domain, but overlap only in a part of the sending periodicity. For example, the first synchronization signal and the second synchronization signal overlap in time domain in the first sending periodicity in which the first synchronization signal and the second synchronization signal appear at the same time, but may not overlap in time domain in the second sending periodicity in which the first synchronization signal and the second synchronization signal appear at the same time. Because time domain lengths of the two synchronization signals are different, in one sending periodicity in which the first synchronization signal and the second synchronization signal overlap in time domain, the two synchronization signals may not completely overlap in time domain, but may only partially overlap.

Figure 5:
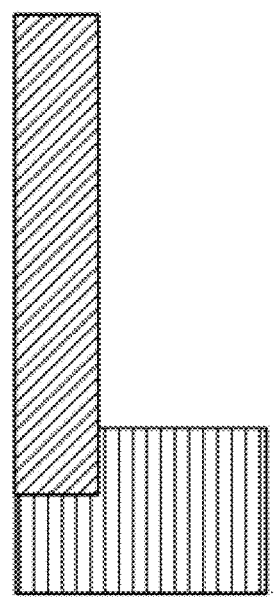
FIG. 5 is a schematic diagram in which there is an intersection set between a frequency domain resource corresponding to a broadband synchronization signal and a frequency domain resource corresponding to a narrowband synchronization signal according to an embodiment.

In addition, it can be learned from FIG. 4A and FIG. 4B that, in a time domain resource in which the first synchronization signal and the second synchronization signal overlap, there is an intersection between the frequency domain resource corresponding to the first synchronization signal and the frequency domain resource corresponding to the second synchronization signal. In addition, FIG. 4A and FIG. 4B are examples in which the frequency domain resource corresponding to the narrowband synchronization signal is a proper subset of the frequency domain resource corresponding to the broadband synchronization signal. Another possibility is that, referring to FIG. 5, a box with slashes represents a broadband synchronization signal, and a box with vertical lines represents a narrowband synchronization signal. It can be learned from FIG. 5 that there is only an intersection set between the frequency domain resource corresponding to the narrowband synchronization signal and the frequency domain resource corresponding to the broadband synchronization signal, but the frequency domain resource corresponding to the narrowband synchronization signal is not a proper subset of the frequency domain resource corresponding to the broadband synchronization signal. In the following, the technical solutions of the embodiments are mainly described by using an example in which the frequency domain resource corresponding to the narrowband synchronization signal is a proper subset of the frequency domain resource corresponding to the broadband synchronization signal.

If the second synchronization signal is a narrowband synchronization signal, and the first synchronization signal is a broadband synchronization signal, the frequency domain resource corresponding to the second synchronization signal is M resource units, and the frequency domain resource corresponding to the first synchronization signal is K*M resource units. If the first synchronization signal is a narrowband synchronization signal, and the second synchronization signal is a broadband synchronization signal, the frequency domain resource corresponding to the first synchronization signal is M resource units, and the frequency domain resource corresponding to the second synchronization signal is K*M resource units, where M is a positive integer, and K is an integer greater than 1, or K may be an integer greater than 1 or a decimal greater than 1.

In the embodiments, the resource unit may be a resource element or an RB, or may be resource unit in another frequency domain. This is not specifically limited. For example, one resource unit may include an integral quantity of subcarriers. For example, in an LTE system, one resource unit may be a frequency resource corresponding to one RB. That is, one resource unit is one RB. In this case, one resource unit includes 12 consecutive subcarriers, where a carrier spacing between two adjacent subcarriers is 15 kHz. For another example, in an NR system, one resource unit may alternatively be a frequency resource corresponding to one RB. That is, one resource unit is one RB. In this case, one resource unit includes 12 consecutive subcarriers, where a carrier spacing between two adjacent subcarriers is configurable or is associated with a frequency band deployed in the NR system, and may be, for example, 15 kHz, 30 kHz, 60 kHz, or 120 kHz.

It should be noted that, in this embodiment, that a frequency resource corresponding to a synchronization signal is M resource units may be understood as that the frequency resource used when the network device sends the synchronization signal are M resource units. Assuming that a sequence length of a sequence corresponding to the synchronization signal sent by the network device is M1, M has both the following features (1) and (2):

(1) A quantity of subcarriers included in the M resource units is equal to or greater than M1.

(2) M is a minimum integer satisfying (1).

Alternatively, M has both the following features (3) and (4):

(3) A quantity of subcarriers included in the M resource units is less than or equal to M1.

(4) M is a maximum integer satisfying (3).

For example, it is assumed that a frequency unit corresponding to the synchronization signal is represented by an RB, one RB includes 12 consecutive subcarriers, and the sequence length of the sequence corresponding to the synchronization signal sent by the network device is 127, M=12. Further, optionally, because the 12 resource units include 144 subcarriers, and the sequence length of the sequence corresponding to the synchronization signal sent by the network device is 127, 144−127=17 subcarriers are not corresponding to sending of the synchronization signal. On the 17 subcarriers, the network device may send nothing or send other information. Even in this case, in this embodiment, for ease of description, the frequency resource corresponding to the synchronization signal may still be understood as 12 RBs. That is, in this embodiment, as long as M has both the foregoing features (1) and (2), or both the foregoing features (3) and (4), the M resource units may be understood as the frequency resource used when the network device sends the synchronization signal.

Similarly, that a frequency resource corresponding to a synchronization signal is K*M resource units may be understood as that the frequency resource used when the network device sends the synchronization signal is K*M resource units, or may be understood as that K*M has both the following features (5) and (6) if it is assumed that a sequence length of a sequence corresponding to the synchronization signal sent by the network device is M2:

(5) A quantity of subcarriers included in the K*M resource units is equal to or greater than M2.

(6) K*M is a minimum integer satisfying (1).

Alternatively, K*M has both the following features (7) and (8):

(7) A quantity of subcarriers included in the K*M resource units is equal to or less than M2.

(8) K*M is a maximum integer satisfying (3).

The first synchronization signal may be generated based on a first sequence, and the second synchronization signal may be generated based on a second sequence; or the first synchronization signal may be generated based on a second sequence, and the second synchronization signal may be generated based on a first sequence. The first sequence may be considered as a sequence used to generate a broadband synchronization signal, and the second sequence is a sequence used to generate a narrowband synchronization signal.

In step S31, the network device may obtain the first sequence and the second sequence in a plurality of manners, which are separately described below.

In a first embodiment, the first sequence is obtained based on the second sequence. For example, the second sequence may be a ZC sequence (Zadoff-Chu sequence), a Walsh sequence, a Gold sequence, or an m sequence, or may be another sequence.

In the first embodiment, the network device first obtains the second sequence, and then obtains the first sequence. It should be noted that the second sequence may also be specified in a standard protocol or predefined. In this case, the network device obtains the second sequence. This step does not need to be performed, and the network device may directly determine the second sequence. Because the second sequence is a sequence used to generate a narrowband synchronization signal, a length of the second sequence may not be applicable to a broadband synchronization signal. Therefore, another sequence, for example, referred to as a third sequence, may be introduced, and the second sequence may be "stretched" by using the third sequence, to obtain the first sequence. It may be understood that the first sequence may be obtained based on the second sequence and the third sequence. Alternatively, the first sequence may also be specified in a standard protocol or predefined. In this case, the network device obtains the first sequence. This step does not need to be performed either, and the network device may directly determine the first sequence. In the following, an example in which the network device needs to obtain the second sequence and needs to obtain the first sequence is mainly used. If the network device directly determines the first sequence without obtaining the first sequence, the first sequence determined by the network device and the first sequence obtained by the network device have a same feature. Similarly, if the network device directly determines the second sequence without obtaining the second sequence, the second sequence determined by the network device and the second sequence obtained by the network device have a same feature.

In this embodiment, the third sequence may be an all-1 sequence. That is, all elements included in the third sequence are 1. Alternatively, the third sequence may be an orthogonal sequence, and a fifth sequence is obtained based on the third sequence. In this case, the fifth sequence may also be an orthogonal sequence, or the fifth sequence may be a sequence obtained based on a deformation of the orthogonal sequence (the third sequence). If the third sequence is an orthogonal sequence, optionally, the third sequence may be a constant amplitude zero auto-correlation (constant amplitude zero auto-correlation, CAZAC) sequence, or a Walsh (Walsh) sequence, or may be another orthogonal sequence.

A length of the second sequence is, for example, N, and a length of the third sequence is, for example, H. L is a quantity of subcarriers included in the M resource units, and K*L is the length of the first sequence. The first sequence may be understood as a sequence including elements carried on subcarriers included in the M resource units. For example, assuming that L=12, M=1, a resource unit is one RB, and K=6, a sequence including elements carried on 72 subcarriers is the first sequence, and an element in the first sequence may include or may not include zero. Both N and H are integers. In addition, a relationship between N and L is not limited. For example, N may be greater than or equal to L, or N may be less than L. Similarly, a relationship between H and K is not limited. For example, H may be greater than or equal to K, or H may be less than K.

A fourth sequence whose length is L may be obtained based on the second sequence whose length is N. This may be understood that if the second sequence itself is suitable for generating a narrowband synchronization signal, for example, an arrangement order of sequence elements included in the second sequence, a sequence length, and the like are properly suitable for the narrowband synchronization signal, the second sequence does not need to be processed, and the first sequence may be directly obtained based on the second sequence. The fifth sequence whose length is K may be obtained based on the third sequence whose length is H. This may be understood that if the third sequence itself is properly suitable for generating a broadband synchronization signal, for example, an arrangement order of sequence elements included in the third sequence, a sequence length, and the like are properly suitable for the broadband synchronization signal, the third sequence does not need to be processed, and the first sequence used for the broadband synchronization signal may be directly obtained based on the second sequence and the third sequence.

There are a plurality of different manners of obtaining the first sequence based on the second sequence and the third sequence.

(1) In a first manner of obtaining the first sequence based on the second sequence and the third sequence, the first sequence whose length is K*L may be obtained based on the second sequence whose length is N and the fifth sequence whose length is K. Optionally, for example, a sequence whose length is K*N is obtained based on the second sequence whose length is N and the fifth sequence whose length is K, and then the first sequence whose length is K*L is obtained based on the sequence whose length is K*N. In other words, the first sequence whose length is K*L is obtained based on the sequence whose length is K*N, and the sequence whose length is K*N is obtained based on the second sequence whose length is N and the fifth sequence whose length is K.

The fifth sequence whose length is K is obtained based on the third sequence whose length is H. In other words, the fifth sequence whose length is K may be obtained based on the third sequence whose length is H. In this case, it may be considered that if the third sequence does not need to be processed, for example, H=K, that is, the length and the arrangement order of sequence elements of the third sequence are respectively corresponding to the length and the arrangement order of sequence elements of the fifth sequence, the third sequence may be directly used. In this case, the third sequence is the fifth sequence, and the network device does not need to perform the step of obtaining the fifth sequence based on the third sequence. Alternatively, it may be considered that H is not equal to K, that is, the length of the third sequence is inappropriate. The third sequence needs to be processed first, to obtain the fifth sequence whose length is K. More generally, if the third sequence and the fifth sequence are completely the same, that is, the sequence elements included in the third sequence are the same as those included in the fifth sequence, and the arrangement order of the sequence elements included in the third sequence is also the same as that of the sequence elements included in the fifth sequence, the third sequence does not need to be processed, and the third sequence may be directly used. In this case, the third sequence is the fifth sequence. Otherwise, the third sequence needs to be processed first, to obtain the fifth sequence whose length is K.

For example, the third sequence is an all-1 sequence. In this case, if H is greater than K, K sequence elements may be extracted from the third sequence whose length is H, and the K sequence elements form the fifth sequence. If H is less than K, the third sequence whose length is H may be extended until the length is extended to K. In this way, the fifth sequence whose length is K is obtained. A method for extending the third sequence may be cyclic extension or the like. The cyclic extension is cyclic extension based on the original third sequence whose length is H. For example, the third sequence whose length is H is $\{c_0, c_1, \ldots, c_{H-1}\}$, and cyclic extension may be performed on the third sequence to obtain $\{c_0, c_1, \ldots, c_{H-1}, c_0, C_1, c_3 \ldots \}$.

Alternatively, if the third sequence is an orthogonal sequence, the fifth sequence may be considered as a sequence obtained based on a deformation of the orthogonal sequence. A method for deforming the orthogonal sequence may include truncation, cyclic extension, zero padding, equal-interval sampling, unequal-interval sampling, or the like. It should be noted that the orthogonal sequence needs to be deformed mainly because a sequence length of an orthogonal sequence corresponding to the third sequence may not match K, or may not match a sequence length required by the first sequence. For example, when K=6, to obtain more orthogonal sequences having a relatively ideal cross-correlation feature, for example, a CAZAC sequence, the sequence length of the orthogonal sequence corresponding to the third sequence may be an odd number, for example, the length is 7. In this case, a truncation operation needs to be performed on the orthogonal sequence corresponding to the third sequence, to obtain the fifth sequence. That is, the third sequence whose length is 7 (H=7) is truncated to obtain the fifth sequence whose length is 6 (K=6), and then the first sequence is obtained based on the fifth sequence and the second sequence, or based on the fifth sequence and the fourth sequence.

In this embodiment, the truncation means that when the length of the orthogonal sequence (the third sequence) on which the fifth sequence is based is greater than K, the fifth sequence is obtained by truncating the orthogonal sequence on which the fifth sequence is based. The cyclic extension means that when the length of the orthogonal sequence (the third sequence) on which the fifth sequence is based is less than K, the fifth sequence is obtained by performing cyclic extension on the orthogonal sequence on which the fifth sequence is based. In addition to the cyclic extension, the fifth sequence may alternatively be obtained by padding zeros to the orthogonal sequence (the third sequence) on which the fifth sequence is based. Alternatively, the fifth sequence includes all sequence elements in the orthogonal sequence on which the fifth sequence is based and some sequence elements extracted from the orthogonal sequence (the third sequence) on which the fifth sequence is based, for example, the extracted some sequence elements are added after the sequence elements of the orthogonal sequence on which the fifth sequence is based. How to extract the sequence elements is not specifically limited. In addition, the fifth sequence may alternatively be obtained based on equal-interval sampling and reordering of the orthogonal sequence (the third sequence). For example, the orthogonal sequence (the third sequence whose length is H) on which the fifth sequence is based is represented as $\{d_0, d_1, \ldots, d_{H-1}\}$, s represents a third length, namely, a sampling interval, and s is a positive integer that is mutually prime to H. In this case, a sequence obtained after equal-interval sampling and reordering are performed on the orthogonal sequence based on s may be represented as $\{d_{(s*i) mod\ H}, 0 \leq i \leq H-1\}$. There is another reordering manner, which is not specifically limited.

The length of the second sequence is N, and may not match or match the length L required by the first sequence. If N is not equal to L, the network device may obtain a sequence whose length is K*N based on the fifth sequence and the second sequence. Because the length N of the second sequence is inappropriate, the network device further needs to process the sequence whose length is K*N, to obtain the first sequence whose length is K*L. For a manner in which the first sequence whose length is K*L is obtained based on the sequence whose length is K*N, refer to a manner in which the fifth sequence whose length is K is obtained based on the third sequence whose length is H, or refer to the following manner in which the fourth sequence whose length is L is obtained based on the second sequence whose length is N. Details are not described. If the second sequence whose length is N does not need to be further processed, for example, N=L, the second sequence whose length is N is the fourth sequence whose length is L, and the network device may directly obtain the first sequence whose length is K*L based on the fourth sequence and the fifth sequence. This may alternatively be understood as that the first sequence whose length is K*L may be directly obtained based on the second sequence and the fifth sequence, and no further processing needs to be performed to obtain the first sequence. In other words, the step of obtaining the first sequence whose length is K*L based on the sequence whose length is K*N does not need to be performed.

In addition, if the second sequence whose length is N does not need to be further processed, for example, N=L, the network device may directly generate a narrowband synchronization signal based on the fourth sequence. In other words, a sequence used for the narrowband synchronization signal may directly be the second sequence whose length is N. There is no need to generate the narrowband synchronization signal after the fourth sequence whose length is L is obtained based on the second sequence whose length is N. If the second sequence whose length is N needs to be further processed, for example, N is not equal to L, the network device needs to first obtain the fourth sequence whose length is L based on the second sequence whose length is N, and then generate a narrowband synchronization signal based on the fourth sequence whose length is L. In other words, the fourth sequence whose length is L and that is used for the narrowband synchronization signal is obtained based on the second sequence whose length is N.

If the second sequence whose length is N does not need to be further processed, for example, N=L, the sequence whose length is K*N and that is obtained by the network device is the first sequence whose length is K*L, and the network device does not need to perform a process of obtaining the first sequence whose length is K*L based on the sequence whose length is K*N.

However, if the second sequence whose length is N needs to be further processed, for example, N is not equal to L, the network device obtains the sequence whose length is K*N, and the network device needs to process the sequence whose length is K*N, to obtain the first sequence whose length is K*L. For a manner in which the network device processes the sequence whose length is K*N to obtain the first sequence whose length is K*L, refer to the following manner in which the network device processes the second sequence whose length is N to obtain the fourth sequence whose length is L, or refer to the foregoing manner in which the network device processes the third sequence whose length is H to obtain the fifth sequence whose length is K.

(2) In a second embodiment for obtaining the first sequence based on the second sequence and the third sequence, the fourth sequence whose length is L may be obtained based on the second sequence whose length is N, and then the first sequence whose length is K*L is obtained based on the fourth sequence whose length is L and the fifth sequence whose length is K. In other words, the first sequence whose length is K*L is obtained based on the fourth sequence whose length is L and the fifth sequence whose length is K, and the fourth sequence whose length is L is obtained based on the second sequence whose length is N.

In this case, if the third sequence does not need to be processed, for example, H=K, that is, the length of the third sequence is proper (for example, the third sequence having a proper length is the fifth sequence), the third sequence may not need to be processed, but the third sequence is directly used. In this case, the third sequence is the fifth sequence. In this case, the step of obtaining the fifth sequence based on the third sequence does not need to be performed. Alternatively, it may be considered that H is not equal to K, that is, the length of the third sequence is inappropriate. The third sequence needs to be processed first, to obtain the fifth sequence whose length is K. For a manner of processing the third sequence to obtain the fifth sequence, refer to related descriptions in the first manner of obtaining the first sequence based on the second sequence and the third sequence. More generally, if the third sequence and the fifth sequence are completely the same, that is, the sequence elements included in the third sequence are the same as those included in the fifth sequence, and the arrangement order of the sequence elements included in the third sequence is also the same as that of the sequence elements included in the fifth sequence, the third sequence does not need to be processed, and the third sequence may be directly used. Otherwise, the third sequence needs to be processed first, to obtain the fifth sequence whose length is K.

The length of the second sequence is N, and may match or not match the length L required by the first sequence. If the second sequence does not need to be further processed, for example, N=L, the second sequence whose length is N is the fourth sequence whose length is L, and the network device may directly obtain the first sequence whose length is K*L based on the second sequence and the fifth sequence, or may directly generate a narrowband synchronization signal based on the second sequence. Other processing does not need to be performed on the second sequence. That is, the step of obtaining the fourth sequence whose length is L based on the second sequence whose length is N does not need to be performed.

If the second sequence needs to be further processed, for example, N is not equal to L, the network device may first process the second sequence to obtain a suitable fourth sequence whose length is L, then obtain the first sequence whose length is K*L based on the fourth sequence and the fifth sequence, and generate a narrowband synchronization signal based on the fourth sequence. For example, the second sequence is $\{b_0, b_1, \ldots, b_{N-1}\}$, and a manner in which the network device processes the second sequence to obtain the fourth sequence is as follows:

For example, if N is greater than L, the network device may extract L sequence elements from the second sequence whose length is N $\{b_0, b_1, \ldots, b_{N-1}\}$. The L sequence elements form the fourth sequence, and the fourth sequence may be used to generate the narrowband synchronization signal. For example, the extracted L sequence elements may be first L consecutive sequence elements or last L consecutive sequence elements in the second sequence whose length is N. More generally, in this embodiment, how to extract the L sequence elements is not specifically limited. For example, any L consecutive sequence elements may be extracted from the second sequence, or any L inconsecutive sequence elements may be extracted from the second sequence.

Alternatively, if N is less than L, the network device may extend the second sequence whose length is N until the length of the second sequence is L, to obtain the fourth sequence whose length is L. A method for extending the second sequence includes but is not limited to zero padding, cyclic extension, or the like. The zero padding is to pad LN zeros based on an original second sequence whose length is N $\{b_0, b_1, \ldots, b_{N-1}\}$, to form a fourth sequence. For example, the fourth sequence is $\{b_0, b_1, \ldots, b_{N-1}, 0, 0, \ldots, 0\}$, or $\{0, 0, \ldots, 0, b_0, b_1, \ldots, b_{N-1}\}$. A sequence of the L-N zeros in the fourth sequence is not specifically limited. The cyclic extension is cyclic extension based on the original second sequence whose length is N $\{b_0, b_1, \ldots, b_{N-1}\}$. For example, an obtained fourth sequence may be $\{b_0, b_1, \ldots, b_{N-1}, b_0, b_1, b_2, \ldots\}$. It should be noted that, in addition to the cyclic extension, any L-N elements may be extracted from the second sequence whose length is N, and padded to the second sequence to form a fourth sequence whose length is L. Locations of the extracted L-N elements in the second sequence may or may not be adjacent.

For better understanding, the following describes a manner of obtaining the first sequence based on the fourth sequence and the fifth sequence by using an example.

For example, the fourth sequence is $\{a_0, a_1, \ldots, a_{L-1}\}$, the fifth sequence is $\{b_0, b_1, \ldots, b_{K-1}\}$, and the first sequence whose length is K*L may be $\{a_0 b_0, a_1 b_0, a_2 b_0, \ldots, a_{L-1} b_0, a_0 b_1, a_1 b_1, a_2 b_1, \ldots, a_{L-1} b_1, \ldots, a_0 b_{K-1}, a_1 b_{K-1}, a_2 b_{K-1}, \ldots, a_{L-1} b_{K-1}\}$. The first sequence constructed in this manner may maintain a relatively good characteristic of the ZC sequence on the M resource units. If the first sequence is constructed in this manner, and the third sequence is an all-1 sequence (or the fifth sequence is an all-1 sequence), K*M resource units corresponding to a broadband synchronization signal may be considered as including K parts, and each part includes M resource units. For example, the $1^{st}$ resource unit to the $M^{th}$ resource unit are one of the K parts, the $(M+1)^{th}$ resource unit to the $(2M)^{th}$ resource unit are another of the K parts, and so on. In this case, a sequence carried in each of the K parts may be the same as a sequence carried in M resource units corresponding to a narrowband synchronization signal. It may also be understood that the first sequence includes K parts, and each of the K parts and the second sequence are a same sequence. A manner of generating the first sequence having such property is relatively simple. Alternatively, it may be understood that a first synchronization signal corresponding to the first sequence is obtained by repeating or retransmitting a second synchronization signal corresponding to the second sequence in frequency domain.

Herein, if no operation needs to be further performed on the second sequence and the third sequence, it may also be considered that the fourth sequence is the second sequence, and the fifth sequence is the third sequence. It should be noted that, in this embodiment, a carried sequence may be understood as that a sequence element included in the sequence is mapped to a corresponding resource unit. For example, a sequence carried in each of the K parts may be understood as a sequence element carried in each of the K parts.

Figure 6:
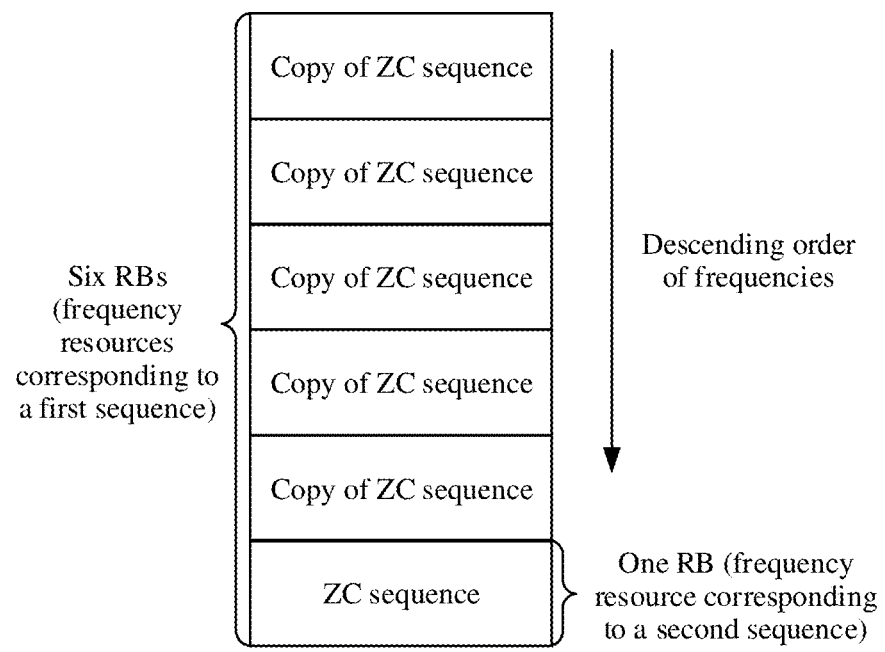
FIG. 6 is a schematic diagram in which a part of a first sequence is the same as a second sequence according to an embodiment.

Referring to FIG. 6, for example, one resource unit is one RB, and M=1. In this case, a sequence carried on a frequency resource corresponding to each RB is a same sequence, namely, the second sequence. For example, the second sequence is a ZC sequence. In FIG. 6, a copy of ZC sequence indicates that a same ZC sequence is carried. It should be noted that the M resource units corresponding to the narrowband synchronization signal may be any part in the K parts included in the K*M resource units corresponding to the broadband synchronization signal. For example, in FIG. 6, the M resource units corresponding to the narrowband synchronization signal are a part whose frequency is lowest in the K parts included in the K*M resource units corresponding to the broadband synchronization signal. However, in this embodiment, locations of the M resource units corresponding to the narrowband synchronization signal in the K*M resource units corresponding to the broadband synchronization signal are not limited. In other words, the M resource units corresponding to the narrowband synchronization signal may be any part in the K parts included in the K*M resource units corresponding to the broadband synchronization signal.

Figure 7A:
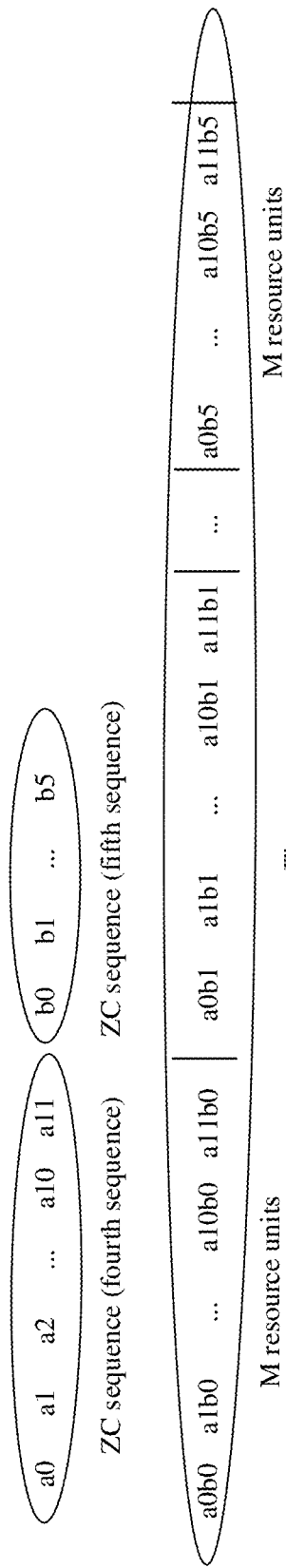
FIG. 7A to FIG. 7C are schematic diagrams of several manners of obtaining a first sequence according to an embodiment.

Referring to FIG. 7A, for example, L=12 and K=6. For example, both the fourth sequence and the fifth sequence are ZC sequences. For example, the fourth sequence is $\{a_0, a_1, \ldots, a_{11}\}$, and the fifth sequence is $\{b_0, b_1, \ldots, b_5\}$. The first sequence obtained based on the fourth sequence whose length is 12 and the fifth sequence whose length is 6 may be $\{a_0 b_0, a_1 b_0, a_2 b_0, \ldots, a_{11} b_0, a_0 b_1, a_1 b_1, a_2 b_1, \ldots, a_{11} b_1, \ldots, a_0 b_5, a_1 b_5, a_2 b_5, \ldots, a_{11} b_5\}$. Herein, if no operation needs to be further performed on the second sequence and the third sequence, it may also be considered that the fourth sequence is the second sequence, and the fifth sequence is the third sequence.

Alternatively, the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod L}, 0 \leq i \leq K*L-1\}$, where mod is a modulo operator. Herein, if no operation needs to be further performed on the second sequence and the third sequence, it may also be considered that the fourth sequence is the second sequence, and the fifth sequence is the third sequence. In the first sequence constructed in this manner, auto-correlation of parts of the first sequence on different M resource units may be different.

Figure 7B:
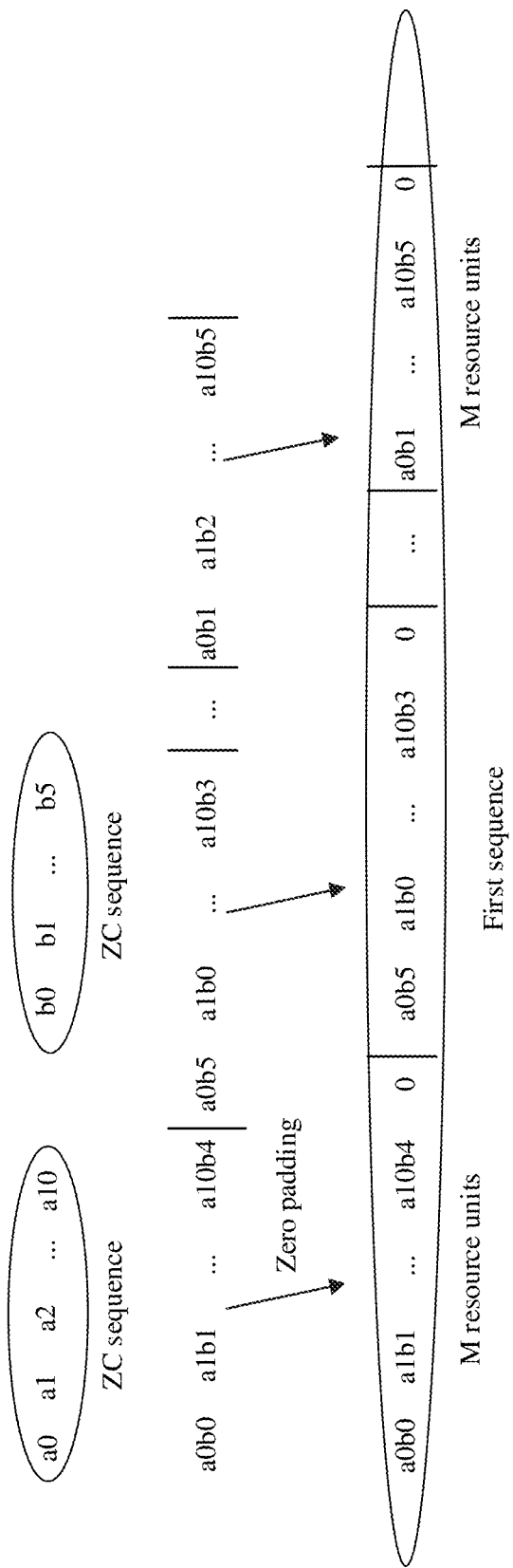

Referring to FIG. 7B, for example, N=11 and K=6. For example, both the second sequence and the fifth sequence are ZC sequences. For example, the second sequence is $\{a_0, a_1, \ldots, a_{10}\}$, and the fifth sequence is $\{b_0, b_1, \ldots, b_5\}$. The first sequence obtained based on the second sequence whose length is 11 and the fifth sequence whose length is 6 may be $\{a_0 b_0, a_1 b_1, \ldots, a_{10} b_4, 0, a_0 b_5, a_1 b_0, \ldots, a_{10} b_3, 0, \ldots, a_0 b_1, \ldots, a_{10} b_5, 0\}$. It should be noted that, in this embodiment, the second sequence whose length is N=11 is padded with one zero, to obtain the fourth sequence whose length is L=12, and then a $\{c_i = a_{i \bmod L} b_{i \bmod L}, 0 \leq i \leq K*L-1\}$ operation is performed on corresponding elements of the fourth sequence and corresponding elements of the fifth sequence whose length is K=6. Alternatively, $\{c_i = a_{i\ mod\ L} b_{i\ mod\ K}, 0 \leq i \leq K*N-1\}$ may be first performed on the second sequence whose length is N=11 and a corresponding element of the fifth sequence whose length is K=6, and then zero padding is performed to obtain the first sequence whose length is 72. FIG. 7B shows the latter implementation. For example, the second sequence is first multiplied by a corresponding element of the fifth sequence according to a formula $\{c_i = a_{i\ mod\ L} b_{i\ mod\ K}, 0 \leq i \leq K*N-1\}$, and zero padding is performed.

Alternatively, the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i\ mod\ L} b_{i\ mod\ K}, 0 \leq i \leq K*L-1\}$ at equal intervals of a first length, where the first length and K*L are prime to each other. In this manner, after a sequence obtained based on the second sequence and the third sequence is sampled, the first sequence is constructed, so that a sequence on every M resource units has a relatively ideal auto-correlation characteristic as far as possible.

Figure 7C:
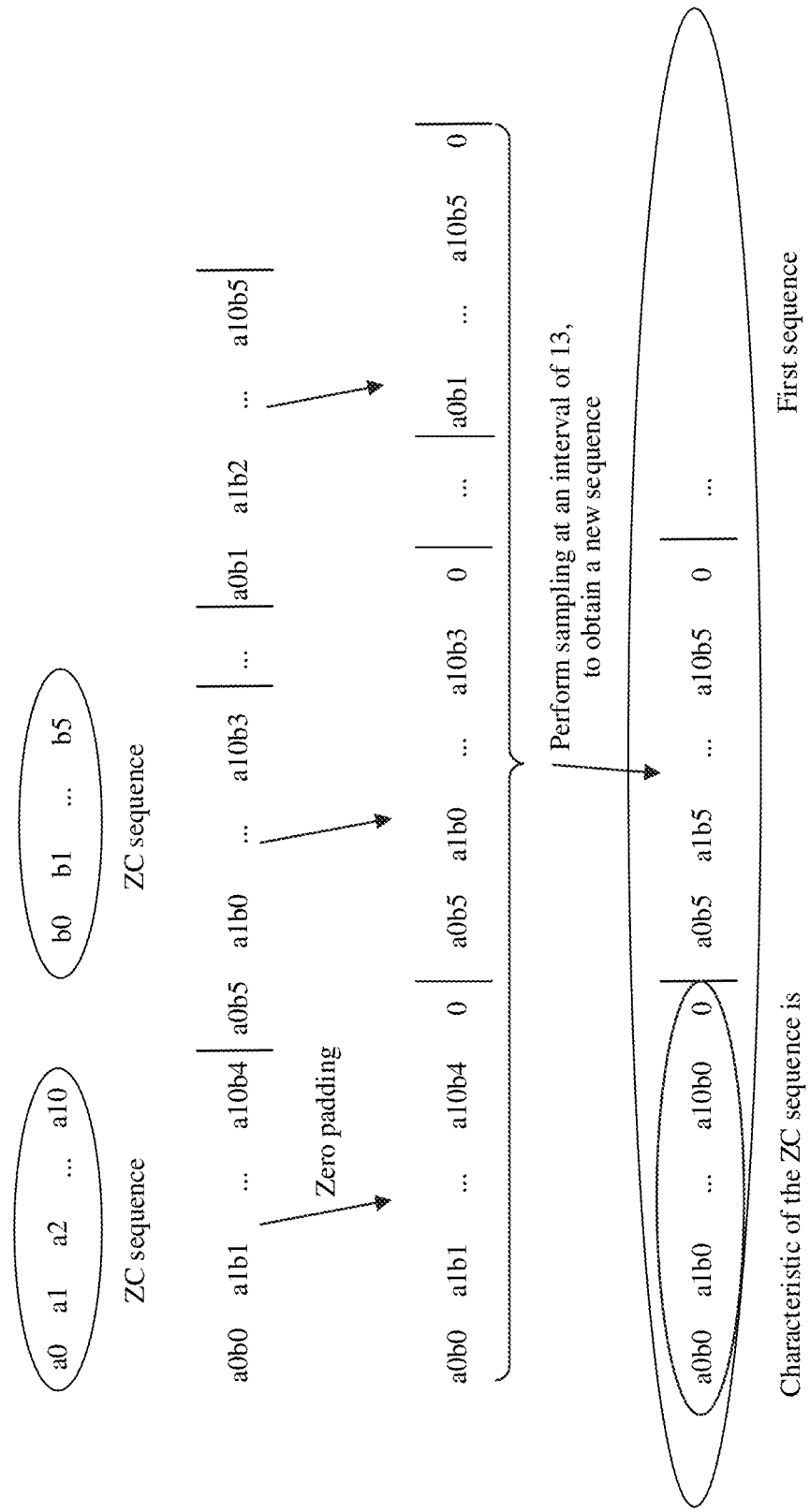

Referring to FIG. 7C, for example, N=11, L=12, and K=6. For example, both the second sequence and the fifth sequence are ZC sequences. For example, the second sequence is $\{a_0, a_1, \ldots, a_{11}\}$, and the fifth sequence is $\{b_0, b_1, \ldots, b_5\}$. The sequence obtained based on the second sequence whose length is 11 and the fifth sequence whose length is 6 may be $\{a_0 b_0, a_1 b_1, \ldots, a_{10} b_4, 0, a_0 b_5, a_1 b_0, \ldots, a_{10} b_3, 0, \ldots, a_0 b_1, \ldots, a_{10} b_5, 0\}$. In another example, the first length is equal to 13. In other words, equal-interval sampling is performed on the sequence at an interval of 13, and an obtained first sequence is $\{a_0 b_0, a_1 b_0, \ldots, a_{10} b_0, 0, a_0 b_5, a_1 b_5, \ldots, a_{10} b_5, 0, \ldots\}$.

(3) In a third embodiment for obtaining the first sequence based on the second sequence and the third sequence, the sequence whose length is H*N may be obtained based on the second sequence whose length is N and the third sequence whose length is H, and then the first sequence whose length is K*L is obtained based on the sequence whose length is H*N. In other words, the first sequence whose length is K*L is obtained based on the sequence whose length is H*N, and the sequence whose length is H*N is obtained based on the second sequence whose length is N and the third sequence whose length is H.

The length of the second sequence is N, and may match or not match the length L required by the first sequence. If the second sequence does not need to be further processed, for example, N=L, the second sequence whose length is N is the fourth sequence whose length is L. The network device may directly obtain the sequence whose length is H*L based on the second sequence. The second sequence may be directly used for the narrowband synchronization signal, and other processing does not need to be performed on the second sequence. If the second sequence needs to be further processed, for example, N is not equal to L, a manner used by the network device is to generate the sequence whose length is H*N based on the second sequence whose length is N, and then obtain the first sequence after processing the sequence whose length is H*N. In addition to obtaining the first sequence, the network device further needs to obtain the second sequence. The network device needs to process the second sequence whose length is N to obtain the fourth sequence whose length is L, and then generate the narrowband synchronization signal based on the fourth sequence. Herein, a process in which the network device processes the second sequence whose length is N to obtain the fourth sequence whose length is L may be understood as that sequence elements included in the second sequence whose length is N are mapped to L resource units (for example, subcarriers), or the second sequence whose length is N is used for a narrowband synchronization signal whose length is L. A set including elements carried on the L resource units (or subcarriers) may be considered as the fourth sequence whose length is L. For a manner in which the network device processes the second sequence whose length is N to obtain the fourth sequence whose length is L, refer to the foregoing related descriptions.

The length of the third sequence is H, and may match or not match the length K required by the first sequence. If the third sequence does not need to be further processed, for example, H=K, the third sequence whose length is H is the fifth sequence whose length is K, and the network device may directly obtain the sequence whose length is K*N based on the fifth sequence. If the third sequence needs to be further processed, for example, H is not equal to K, a manner used by the network device is to generate the sequence whose length is H*N based on the third sequence whose length is H, and then obtain the first sequence after processing the sequence whose length is H*N.

If neither the second sequence nor the third sequence needs to be further processed, for example, N=L and H=K, the sequence whose length is H*N and that is obtained by the network device is the first sequence whose length is K*L, and the network device does not need to perform the process of obtaining the first sequence whose length is K*L based on the sequence whose length is H*N.

However, if the second sequence needs to be further processed but the third sequence does not need to be further processed, for example, N is not equal to L and H=K, the network device obtains the sequence whose length is K*N, and the network device needs to process the sequence whose length is K*N, to obtain the first sequence whose length is K*L. For a manner in which the network device processes the sequence whose length is K*N to obtain the first sequence whose length is K*L, refer to the foregoing manner in which the network device processes the second sequence whose length is N to obtain the fourth sequence whose length is L, or refer to the foregoing manner in which the network device processes the third sequence whose length is H to obtain the fifth sequence whose length is K.

Alternatively, if the second sequence does not need to be further processed but the third sequence needs to be further processed, for example, N=L and H is not equal to K, the network device obtains the sequence whose length is H*L, and the network device needs to process the sequence whose length is H*L, to obtain the first sequence whose length is K*L. For a manner in which the network device processes the sequence whose length is H*L to obtain the first sequence whose length is K*L, refer to the foregoing manner in which the network device processes the second sequence whose length is N to obtain the fourth sequence whose length is L, or refer to the foregoing manner in which the network device processes the third sequence whose length is H to obtain the fifth sequence whose length is K.

Alternatively, if both the second sequence and the third sequence need to be further processed, for example, N is not equal to L and H is not equal to K, the network device obtains the sequence whose length is H*N, and the network device needs to process the sequence whose length is H*N, to obtain the first sequence whose length is K*L. For a manner in which the network device processes the sequence whose length is H*N to obtain the first sequence whose length is K*L, refer to the foregoing manner in which the network device processes the second sequence whose length is N to obtain the fourth sequence whose length is L, or refer to the foregoing manner in which the network device processes the third sequence whose length is H to obtain the fifth sequence whose length is K.

For better understanding, the following describes a manner of obtaining the first sequence based on the second sequence and the third sequence by using an example.

For example, the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2n_0, \ldots, m_{N-1}n_0, m_0n_1, m_1n_1, m_2n_1, \ldots, m_{N-1}n_1, \ldots, m_0n_{H-1}, m_1n_{H-1}, m_2n_{H-1}, \ldots, m_{N-1}n_{H-1}\}$.

Alternatively, for example, the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i\ mod\ N} n_{i\ mod\ H}, 0 \leq i \leq H*N-1\}$, where mod is a modulo operator.

Alternatively, for example, the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i\ mod\ N} n_{i\ mod\ H}, 0 \leq i \leq H*N-1\}$ at equal intervals of a second length, where the second length and H*N are prime to each other. The second length may be the same as or different from the first length.

After the sequence whose length is H*N is obtained, the sequence whose length is H*N is processed based on values of K and L, to obtain the first sequence. The first sequence may be understood as a set including elements carried on K*L resource units (or subcarriers).

(4) In a fourth embodiment for obtaining the first sequence based on the second sequence and the third sequence, the fourth sequence whose length is L may be obtained based on the second sequence whose length is N, the sequence whose length is H*L may be obtained based on the fourth sequence whose length is L and the third sequence whose length is H, and then the first sequence whose length is K*L is obtained based on the sequence whose length is H*L. Alternatively, the first sequence whose length is K*L is obtained based on the sequence whose length is H*L, the sequence whose length is H*L is obtained based on the fourth sequence whose length is L and the third sequence whose length is H, and the fourth sequence whose length is L is obtained based on the second sequence whose length is N.

The length of the second sequence is N, and may match or not match the length L required by the first sequence. If the second sequence does not need to be further processed, for example, N=L, the second sequence whose length is N is the fourth sequence whose length is L. The network device may directly obtain the sequence whose length is H*L based on the fourth sequence, that is, may directly determine the sequence whose length is H*L based on the fourth sequence and the third sequence whose length is H, or may directly generate the narrowband synchronization signal based on the fourth sequence. Other processing does not need to be performed on the second sequence. That is, the step of obtaining the fourth sequence whose length is L based on the second sequence whose length is N does not need to be performed when the network device generates the first sequence or generates the narrowband synchronization signal. If the second sequence needs to be further processed, for example, N is not equal to L, a manner used by the network device is to obtain the fourth sequence whose length is L based on the second sequence whose length is N, then generate the sequence whose length is H*L based on the fourth sequence whose length is L, and obtain the first sequence after processing the sequence whose length is H*L. In addition to obtaining the first sequence, the network device further needs to obtain the fourth sequence. The network device needs to process the second sequence whose length is N to obtain the fourth sequence whose length is L, and then generate the narrowband synchronization signal based on the fourth sequence. In other words, a sequence used for the narrowband synchronization signal is obtained based on the second sequence whose length is N. That is, the second sequence is used for the narrowband synchronization signal. For a manner in which the network device processes the second sequence whose length is N to obtain the fourth sequence whose length is L or a manner in which the second sequence is used for the narrowband synchronization signal, refer to the foregoing related descriptions.

The length of the third sequence is H, and may match or not match the length K required by the first sequence. If the third sequence does not need to be further deformed, for example, H=K, the third sequence whose length is H is the fifth sequence whose length is K, and the network device may directly obtain the sequence whose length is K*N based on the fifth sequence. If the third sequence needs to be further deformed, for example, H is not equal to K, a manner used by the network device is to generate the sequence whose length is H*L based on the third sequence whose length is H, and then obtain the first sequence after processing the sequence whose length is H*L. Alternatively, it is understood that the first sequence used for the broadband synchronization signal is obtained based on the sequence whose length is H*L.

If the third sequence does not need to be further deformed, for example, H=K, the sequence whose length is H*L and that is obtained by the network device is the first sequence whose length is K*L, and the network device does not need to perform the process of obtaining the first sequence whose length is K*L based on the sequence whose length is H*L.

Alternatively, if the third sequence needs to be further deformed, for example, H is not equal to K, the network device obtains the sequence whose length is H*L, and the network device needs to process the sequence whose length is H*L, to obtain the first sequence whose length is K*L. For a manner in which the network device processes the sequence whose length is H*L to obtain the first sequence whose length is K*L, refer to the foregoing manner in which the network device processes the second sequence whose length is N to obtain the fourth sequence whose length is L, or refer to the foregoing manner in which the network device processes the third sequence whose length is H to obtain the fifth sequence whose length is K.

It may be learned that in this embodiment, to enable a length of a sequence generated based on the second sequence and the third sequence to match the length required by the first sequence, first, the second sequence may be deformed to obtain the fourth sequence and/or the third sequence may be deformed to obtain the fifth sequence, so that sequence lengths corresponding to the fourth sequence and fifth sequence obtained after the deformation match the length required by the first sequence. Alternatively, the second sequence and the third sequence may not be deformed, but a sequence obtained after the second sequence and the third sequence are combined may be directly deformed, so that a sequence length of the sequence matches the length required by the first sequence. A deformation manner includes truncation, extension, sampling, or the like, and is not specifically limited.

In a second exemplary embodiment, the second sequence is obtained based on the first sequence. In the manner 1 described above, the second sequence corresponding to the narrowband synchronization signal is first obtained, and then the first sequence corresponding to the broadband synchronization signal is obtained based on the second sequence and the third sequence, or the first sequence used for the broadband synchronization signal is obtained based on the second sequence and the third sequence. The second sequence is used for the narrowband synchronization signal. The manner 2 is described herein. The first sequence used for the broadband synchronization signal is first obtained, and a part of the first sequence may be corresponding to the second sequence.

In the second embodiment, amplitudes of all elements included in the first sequence are the same, that is, all the elements included in the first sequence are sequence elements having a constant amplitude, and the second sequence is a part of the first sequence. For example, the K*M resource units corresponding to the broadband synchronization signal may still be considered as including K parts, and each part includes M resource units. For example, the $1^{st}$ resource unit to the $M^{th}$ resource unit are one of the K parts, the $(M+1)^{th}$ resource unit to the $(2M)^{th}$ resource unit are another of the K parts, and so on. In this case, a sequence carried in each of the K parts may be the same as or different from a sequence carried in the M resource units corresponding to the narrowband synchronization signal. If the sequence carried in each of the K parts is the same as the sequence carried in the M resource units corresponding to the narrowband synchronization signal, it may also be understood that the first sequence includes K parts, and each of the K parts and the second sequence are a same sequence. Alternatively, more generally, it is assumed that the M resource units include L subcarriers, and the first sequence is carried on the K*L subcarriers included in the K*M resource units, where a relationship between K*M and a length of the first sequence may satisfy the foregoing relationship, which is not specifically limited. In this case, a set including elements carried on any L subcarriers in the K*L subcarriers may be considered as the second sequence. For example, assuming that the first sequence is $\{d_0, d_1, \ldots, d_{K*L-1}\}$, the second sequence whose length is L may be $\{e_i, e_{i+1}, \ldots, e_{i+L-1}\}$, where $0 \leq i \leq (K-1)*L$.

In the second embodiment, the first sequence may be an m-sequence having a constant amplitude, or certainly may be another sequence.

Sequence elements having a constant amplitude value are used as elements of a sequence. This has an advantage that a sequence obtained after DFT or IDFT is performed on the sequence has an ideal autocorrelation characteristic, thereby facilitating fast synchronization between the terminal device and the network device. In addition, because the second sequence is a part of the first sequence, a system does not need to separately design synchronization sequences for the broadband terminal device and the narrowband terminal device, thereby simplifying design on a system side.

The foregoing describes two manners of obtaining the first sequence and the second sequence. During actual application, a manner to be selected to obtain the first sequence and the second sequence may be specified in a protocol, or may be determined by the network device.

After obtaining the first sequence, the network device may generate the broadband synchronization signal based on the first sequence, and after obtaining the second sequence, the network device may generate the narrowband synchronization signal based on the second sequence. The broadband synchronization signal is the first synchronization signal, and the narrowband synchronization signal is the second synchronization signal; or the broadband synchronization signal is the second synchronization signal, and the narrowband synchronization signal is the first synchronization signal. It should be noted that for the second exemplary embodiment, the network device may generate the broadband synchronization signal based on the first sequence. Because the second sequence is a part of the first sequence, the network device does not need to additionally perform a process of generating the narrowband synchronization signal based on the second sequence.

It should be noted that, in this embodiment, a process of generating a synchronization signal based on a sequence may be understood as a process of mapping a sequence (a sequence used for the synchronization signal) corresponding to the synchronization signal to physical resources occupied by the synchronization signal. The physical resources include a time resource and a frequency resource that are occupied when the network device sends the synchronization signal, and may be represented by using a resource unit, or may be represented by using another method. For example, in an NR system, the time resource occupied when the network device sends the synchronization signal may be represented by using an OFDM symbol index number, and the frequency resource may be represented by using a subcarrier index number. Alternatively, in this embodiment, that the synchronization signal is generated based on the sequence may be understood as that the sequence is used for the synchronization signal. That is, the step of generating the synchronization signal based on the sequence may not need to be performed. For example, the first synchronization signal is generated based on the first sequence, and the first sequence is obtained based on the second sequence and the third sequence. This may be understood that the first sequence used for the first synchronization signal is obtained based on the second sequence and the third sequence, or may be understood as that after the first sequence is obtained based on the second sequence and the third sequence, the first sequence is mapped to time-frequency resources or resource units occupied by the first synchronization signal.

It should be noted that in this embodiment, because of a "nested" structure of the first synchronization signal and the second synchronization signal on frequency domain resource, that is, there is an intersection set between the frequency domain resource corresponding to the first synchronization signal and the frequency domain resource corresponding to the second synchronization signal. Especially, when the frequency domain resource corresponding to the second synchronization signal is a proper subset of the frequency domain resource corresponding to the first synchronization signal, and the time domain resource corresponding to the second synchronization signal is completely the same as the time domain resource corresponding to the first synchronization signal, the network device has generated the second synchronization signal (mapped a sequence corresponding to the second synchronization signal to physical resources occupied by the second synchronization signal) when generating the first synchronization signal (mapping a sequence corresponding to the first synchronization signal to physical resources occupied by the first synchronization signal). This process may also be understood as that the network device generates the first synchronization signal and the second synchronization signal.

Referring back to FIG. 3, in step S32 the network device sends the first synchronization signal and the second synchronization signal, and the terminal device receives the first synchronization signal from the network device.

After generating the first synchronization signal and the second synchronization signal, the network device may send the first synchronization signal and the second synchronization signal. The first synchronization signal and the second synchronization signal overlap in time domain, and within a time domain resource in which the first synchronization signal and the second synchronization signal overlap, there is an intersection set between the frequency domain resource corresponding to the first synchronization signal and the frequency domain resource corresponding to the second synchronization signal. For example, the network device may send the first synchronization signal on the K*M resource units, and send the second synchronization signal on the M resource units; or send the second synchronization signal on the K*M resource units, and send the first synchronization signal on the M resource units, where the M resource units are a proper subset of the K*M resource units.

It should be noted that in this embodiment, because of the "nested" structure of the first synchronization signal and the second synchronization signal on the frequency domain resource, when the frequency domain resource corresponding to the second synchronization signal is a proper subset of the frequency domain resource corresponding to the first synchronization signal, and the time domain resource corresponding to the second synchronization signal is completely the same as the time domain resource corresponding to the first synchronization signal (assuming that the first synchronization signal is a broadband synchronization signal and the second synchronization signal is a narrowband synchronization signal), the network device sends the first synchronization signal. This includes that the network device also sends the second synchronization signal. In this embodiment, this special case is also referred to as that the network device sends the first synchronization signal and the second synchronization signal.

In addition, for the terminal device, the second synchronization signal may be considered as a signal corresponding to the network device. "Corresponding" means that the second synchronization signal is also sent by the network device, and the terminal device may not receive the second synchronization signal temporarily or may have received the second synchronization signal because of a relationship between the first synchronization signal and the second synchronization signal. If the terminal device has not received the second synchronization signal, the second synchronization signal also needs to be introduced. Therefore, it may be described as that the second synchronization signal is corresponding to the network device.

In step S33, the terminal device performs synchronization with the network device based on the first synchronization signal.

If the terminal device is a narrowband terminal device, the first synchronization signal may be a narrowband synchronization signal, the terminal device receives the first synchronization signal by using the M resource units, and the terminal device can perform synchronization with the network device based on the first synchronization signal.

Alternatively, if the terminal device is a broadband terminal device, the first synchronization signal may be a broadband synchronization signal, and the terminal device receives the first synchronization signal by using the K*M resource units. Alternatively, the first synchronization signal may be a narrowband synchronization signal, the terminal device receives the first synchronization signal by using the M resource units, and the terminal device may implement synchronization with the network device based on the first synchronization signal.

Alternatively, if the terminal device is a broadband terminal device, in addition to receiving the first synchronization signal, the terminal device may further receive the second synchronization signal. In this case, the first synchronization signal may be a broadband synchronization signal, and the terminal device receives the first synchronization signal by using the K*M resource units; the second synchronization signal is a narrowband synchronization signal, and the terminal device receives the second synchronization signal by using the M resource units. Alternatively, the second synchronization signal may be a broadband synchronization signal, and the terminal device receives the second synchronization signal received by using the K*M resource units; the first synchronization signal is a narrowband synchronization signal, and the terminal device receives the first synchronization signal by using the M resource units. The terminal device may perform synchronization with the network device based on the first synchronization signal and the second synchronization signal. For example, the terminal device may superimpose the first synchronization signal and the second synchronization signal, and perform synchronization with the network device based on a synchronization signal obtained after the superimposition.

In addition, after completing synchronization with the network device, the terminal device may need to receive a broadcast channel Therefore, in this embodiment, a position relationship between the broadcast channel and the synchronization channel may be configured, so that the terminal device can receive the broadcast channel in time. It should be noted that broadcast information may be considered as information transmitted on the broadcast channel. Based on this, in this embodiment, the broadcast information and the broadcast channel are equivalent. That is, descriptions of the broadcast information and descriptions of the broadcast channel may be replaced by each other.

For example, the network device may generate first broadcast information and second broadcast information, and may send the first broadcast information and the second broadcast information. If the terminal device is a narrowband terminal device, the terminal device may receive only narrowband broadcast information but cannot receive broadband broadcast information. In this case, the first broadcast information may be narrowband broadcast information, the second broadcast information may be broadband broadcast information, and the terminal device receives only the first broadcast information. Alternatively, if the terminal device is a broadband terminal device, the terminal device may receive only broadband broadcast information, or may receive broadband broadcast information and narrowband broadcast information. In this case, the terminal device may further receive the second broadcast information from the network device. In addition, in this case, the first broadcast information may be narrowband broadcast information, and the second synchronization information may be broadband broadcast information; or the first broadcast information may be broadband broadcast information, and the second synchronization information may be narrowband broadcast information. The broadband broadcast information is associated with the broadband synchronization information. For example, the terminal device may determine, based on the received broadband synchronization signal, a time-frequency resource position of the broadband broadcast information. In an exemplary embodiment, the broadband terminal device may implement time-frequency synchronization with the network device by receiving the broadband synchronization signal, and then detect the broadband broadcast information based on information the time-frequency synchronization. Similarly, the narrowband broadcast information is correlated with narrowband synchronization information. For example, the terminal device may determine, based on the received narrowband synchronization signal, a time-frequency position of the narrowband broadcast information. Specifically, the narrowband terminal device or the broadband terminal device may implement time-frequency synchronization with the network device by receiving the narrowband synchronization signal, and then detect the narrowband broadcast information based on the information about the time-frequency synchronization.

For example, a distance between a frequency domain position of the first broadcast information and a frequency domain position of the first synchronization signal is a first frequency domain offset, and a distance between a frequency domain position of the second broadcast information and a frequency domain position of the second synchronization signal is a second frequency domain offset. The first frequency domain offset and the second frequency offset may be preconfigured, or may be specified in a protocol. The terminal device may determine the frequency domain position of the first broadcast information based on the first frequency offset, to receive the first broadcast information, and may determine the frequency domain position of the second broadcast information based on the second frequency offset, to receive the second broadcast information.

The first frequency offset may be equal to 0 or may not be equal to 0. If the first frequency offset is equal to 0, it indicates that a position of a frequency domain resource corresponding to the first broadcast information is the same as a position of the frequency domain resource corresponding to the first synchronization signal. Similarly, if the second frequency offset is equal to 0, it indicates that a position of a frequency domain resource corresponding to the second broadcast information is the same as a position of the frequency domain resource corresponding to the second synchronization signal.

In addition to the frequency domain, a distance between a time domain position of the first broadcast information and a time domain position of the first synchronization signal may be a first time domain offset, and a distance between a time domain position of the second broadcast information and a time domain position of the second synchronization signal may be a second time domain offset. The first time domain offset and the second time domain offset may be preconfigured, or may be specified in a protocol. The terminal device may determine the time domain position of the first broadcast information based on the first time domain offset. When both the time domain position and the frequency domain position of the first broadcast information are determined, the terminal device can receive the first broadcast information at a correct position. Similarly, the terminal device may determine the time domain position of the second broadcast information based on the second time domain offset. When both the time domain position and the frequency domain position of the second broadcast information are determined, the terminal device can receive the second broadcast information at a correct position.

The first time domain offset may be equal to 0 or may not be equal to 0. If the first time domain offset is equal to 0, it indicates that a position of a time domain resource corresponding to the first broadcast information is the same as a position of the time domain resource corresponding to the first synchronization signal. Similarly, if the second time domain offset is equal to 0, it indicates that a position of a time domain resource corresponding to the second broadcast information is the same as a position of the time domain resource corresponding to the second synchronization signal.

By preconfiguring a position relationship between broadcast information and a synchronization signal, the terminal device may directly determine a position of corresponding broadcast information based on a detected synchronization signal, and further detect information transmitted in the broadcast information, to implement data transmission between the terminal device and the network device.

In this embodiment, in a wireless communication system, in addition to the first synchronization signal and the second synchronization signal, a third synchronization signal may further exist, where a frequency domain resource corresponding to the third synchronization signal is larger than the frequency domain resource corresponding to the first synchronization signal. Herein, it is assumed that the frequency domain resource corresponding to the first synchronization signal is larger than the frequency domain resource corresponding to the second synchronization signal. An NR system is used as an example. The frequency domain resource corresponding to the first synchronization signal may be six RBs, the frequency domain resource corresponding to the second synchronization signal may be less than six RBs, and the frequency domain resource corresponding to the third synchronization signal may be 20 RBs. A subcarrier spacing corresponding to the first synchronization signal is the same as that corresponding to the second synchronization signal, for example, 15 kHz. A subcarrier spacing corresponding to the third synchronization signal may be the same as or different from the subcarrier spacing corresponding to the first synchronization signal and the second synchronization signal. Based on such a design, the wireless communication system may serve a narrowband terminal device having a plurality of bandwidth capabilities, for example, a terminal device that accesses the wireless communication system by using a synchronization signal occupying one to six RBs, and may also serve a broadband terminal device, for example, a terminal device that accesses the wireless communication system by using a synchronization signal occupying 20 RBs.

In a current NR system, because a frequency bandwidth deployed in a system is usually relatively wide, relatively sparse synchronization rasters may be designed, to reduce load of initial access of the terminal device. In the NR system, a frequency position of a synchronization raster or synchronization signal may satisfy the following formula: N*1200 kHz+M*50 kHz, where a value of N is an integer greater than or equal to 1 and less than or equal to 2499, and a value of M is 1, 3, or 5.

To simplify a system design and reduce complexity of searching for a synchronization signal by a narrowband terminal device in a broadband system, a frequency position of the first synchronization signal, namely, a synchronization raster corresponding to the first synchronization signal, may also have a same design. That is, the synchronization raster corresponding to the first synchronization signal may satisfy the following formula: N'*1200 kHz+M'*50 kHz+ [C*Channelspace], where Channelspace may represent a frequency value corresponding to a spacing between adjacent carriers. For example, a frequency bandwidth of a broadband system is 100 MHz. If it is assumed that every 20 MHz is corresponding to one carrier, a frequency value corresponding to a spacing between adjacent carriers is 20 MHz. N' and M' are integers, a value of N' may be the same as or different from that of N, and a value of M' may be the same as or different from that of M. No specific limitation is imposed. C is an integer greater than or equal to 0.

Figure 8:
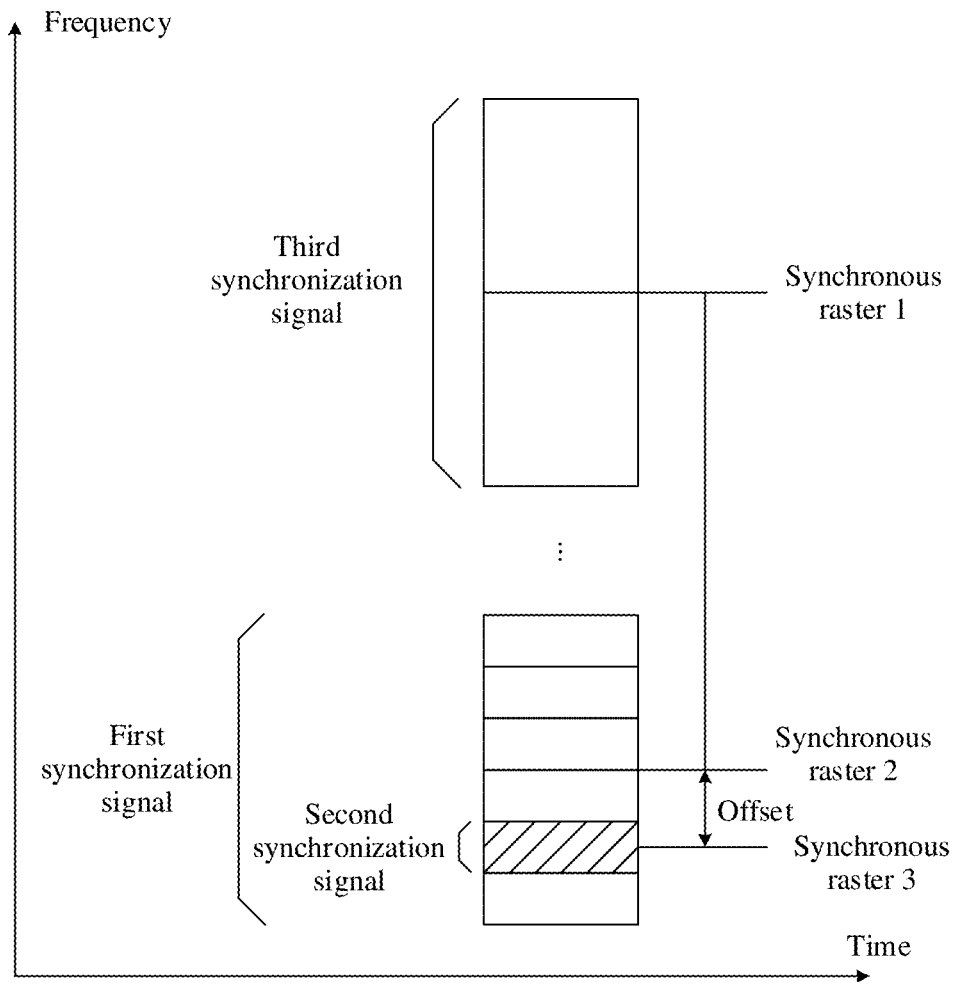
FIG. 8 is a schematic diagram in which a synchronization raster corresponding to a second synchronization signal is offset by one frequency offset based on a synchronization raster corresponding to a first synchronization signal according to an embodiment.

Further, optionally, considering the relationship between the frequency resource corresponding to the first synchronization signal and the frequency resource corresponding to the second synchronization signal, or a nesting relationship between the first synchronization signal and the second synchronization signal, a synchronization raster corresponding to the second synchronization signal may be offset by one frequency offset based on the synchronization raster corresponding to the first synchronization signal. For example, refer to FIG. 8. In FIG. 8, it is assumed that the time domain resource corresponding to the first synchronization signal is completely the same as the time domain resource corresponding to the second synchronization signal, and the frequency domain resource corresponding to the first synchronization signal is six RBs, where the second synchronization signal is carried on one RB. The synchronization raster corresponding to the first synchronization signal satisfies the following formula: N'*1200 kHz+M'*50 kHz+[C*Channelspace]. Detection complexity of the terminal device (where for example, the terminal device of the first synchronization signal can be detected) can be reduced, and overheads of a notification from the network device can also be reduced. It should be noted that, in the descriptions herein, it is assumed that the frequency domain resource corresponding to the first synchronization signal is K*M resource units, and the frequency domain resource corresponding to the second synchronization signal is M resource units.

In this embodiment, the synchronization raster corresponding to the first synchronization signal may be preconfigured, for example, specified in a standard protocol, or may be notified by an access network device to the terminal device. Optionally, the access network device may notify only N', M', and C. The terminal device may determine the synchronization raster corresponding to the first synchronization signal according to the formula N'*1200 kHz+M'*50 kHz+[C*Channelspace]. Optionally, a frequency offset between the synchronization raster corresponding to the second synchronization signal and the synchronization raster corresponding to the first synchronization signal may be preconfigured, for example, specified in a standard protocol, or may be notified by the access network device to the terminal device. For a terminal device that can access the access network device by using the first synchronization signal, the synchronization raster corresponding to the second synchronization signal may be determined by using the offset, and then the frequency position of the second synchronization signal is determined. The access network device does not need to notify the terminal device of an absolute frequency position of the synchronization raster corresponding to the second synchronization signal, thereby reducing system signaling overheads. It should be noted that the access network device may notify the terminal device by using broadcast signaling or terminal device specific signaling. The signaling may be radio resource control signaling, may be physical layer signaling, for example, signaling sent by using a physical layer control channel, or may be media access control signaling. No specific limitation is imposed in the present invention.

It should be noted that, in this embodiment, the first synchronization signal may include at least one of a primary synchronization signal and a secondary synchronization signal, and the second synchronization signal may include at least one of a primary synchronization signal and a secondary synchronization signal. Further, optionally, when the first synchronization signal and the second synchronization signal overlap in time domain, and within the time domain resource in which the first synchronization signal and the second synchronization signal overlap, when there is the intersection between the frequency domain resource corresponding to the first synchronization signal and the frequency domain resource corresponding to the second synchronization signal, the first synchronization signal and the second synchronization signal are both primary synchronization signals or secondary synchronization signals, or may a primary synchronization signal and a secondary synchronization signal.

The following describes, with reference to the accompanying drawings, apparatuses configured to implement the foregoing methods in the embodiments. Therefore, all the foregoing content may be used in the following embodiments, and repeated content is not described again.

Figure 9:
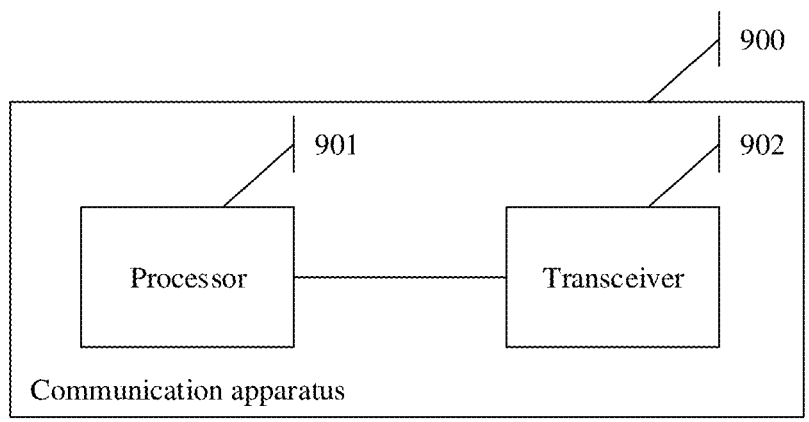
FIG. 9 is a schematic diagram of a communication apparatus that can implement a function of a network device according to an embodiment.

FIG. 9 is a schematic structural diagram of a communication apparatus 900. The communication apparatus 900 may implement functions of the network device described above. The communication apparatus 900 may be the network device described above, or may be a chip disposed in the network device described above. The communication apparatus 900 may include a processor 901 and a transceiver 902. The processor 901 may be configured to: perform S31 in the embodiment shown in FIG. 3, and/or support another process of the technology described herein, for example, perform all or some of other processes than the receiving process and the sending process that are performed by the terminal device described above. The transceiver 902 may be configured to: perform S32 in the embodiment shown in FIG. 3, and/or support another process of the technology described herein, for example, perform all or some of the receiving process and the sending process that are performed by the terminal device described above.

For example, the processor 901 is configured to generate synchronization signals, where the synchronization signals include a first synchronization signal and a second synchronization signal.

The transceiver 902 is configured to send the synchronization signals, where the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

In a possible implementation, the frequency domain resource corresponding to the second synchronization signal is M resource units, and the frequency domain resource corresponding to the first synchronization signal is K*M resource units, where M is a positive integer, and K is an integer greater than 1, or K may be an integer greater than 1 or a decimal greater than 1.

In a possible implementation, the first synchronization signal is generated based on a first sequence, and the second synchronization signal is generated based on a second sequence.

In a possible implementation, the first sequence is obtained based on the second sequence and a third sequence.

In a possible implementation, that the first sequence is obtained based on the second sequence and a third sequence includes at least one of the following:

the first sequence whose length is K*L is obtained based on a sequence whose length is K*N, and the sequence whose length is K*N is obtained based on the second sequence whose length is N and a fifth sequence whose length is K;

the first sequence whose length is K*L is obtained based on a fourth sequence whose length is L and a fifth sequence whose length is K, and the fourth sequence whose length is L is obtained based on the second sequence whose length is N;

the first sequence whose length is K*L is obtained based on a sequence whose length is H*N, and the sequence whose length is H*N is obtained based on the second sequence whose length is N and the third sequence whose length is H; or the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where the fifth sequence whose length is K is obtained based on the third sequence whose length is H, the fourth sequence whose length is L is obtained based on the second sequence whose length is N, and L is a quantity of subcarriers included in the M resource units.

In a possible implementation, the first sequence whose length is K*L is obtained based on the fourth sequence whose length is L and the fifth sequence whose length is K, and the fourth sequence whose length is L is obtained based on the second sequence whose length is N, where the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, \ldots, a_0b_{K-1}, a_1b_{K-1}, a_2b_{K-1}, \ldots, a_{L-1}b_{K-1}\}$;

the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K}, 0 \leq i \leq K*L-1\}$, where mod is a modulo operator; or the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K}, 0 \leq i \leq K*L-1\}$ at equal intervals of a first length, where the first length and K*L are prime to each other.

In a possible implementation, the first sequence whose length is K*L is obtained based on the sequence whose length is H*N, and the sequence whose length is H*N is obtained based on the second sequence whose length is N and the third sequence whose length is H, where the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2n_0, \ldots, m_{N-1}n_0, m_0n_1, m_1n_1, m_2n_1, \ldots, m_{N-1}n_1, \ldots, m_0n_{H-1}, m_1n_{H-1}, m_2n_{H-1}, \ldots, m_{N-1}n_{H-1}\}$;

the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H}, 0 \leq i \leq H*N-1\}$, where mod is a modulo operator; or the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H}, 0 \leq i \leq H*N-1\}$ at equal intervals of a second length, where the second length and H*N are prime to each other, and mod is a modulo operator.

In a possible implementation, the third sequence is an all-1 sequence or an orthogonal sequence.

In a possible implementation, the frequency domain resource corresponding to the second synchronization signal is M resource units, the frequency domain resource corresponding to the first synchronization signal is K*M resource units, both M and K are positive integers, the third sequence is an all-1 sequence, and the K*M resource units include K parts, where each part includes M resource units, and a sequence carried in each part is the same as a sequence carried in the M resource units corresponding to the second synchronization signal.

In a possible implementation, amplitude values of all elements included in the first sequence are the same, and the second sequence is a part of the first sequence.

In a possible implementation, the first sequence is an m-sequence.

All related content of the steps in the foregoing method embodiments may be cited in function descriptions of a corresponding functional module, and details are not described herein again.

Figure 10:
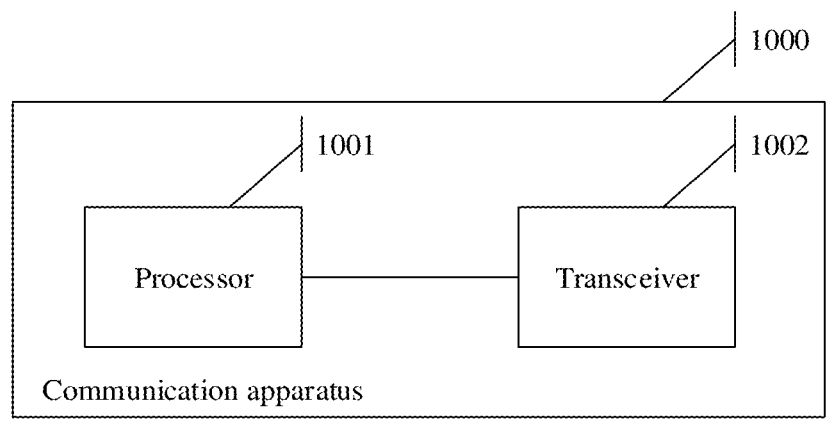
FIG. 10 is a schematic diagram of a communication apparatus that can implement a function of a terminal device according to an embodiment.

FIG. 10 is a schematic structural diagram of a communication apparatus 1000. The communication apparatus 1000 may implement functions of the terminal device described above. The communication apparatus 1000 may be the terminal device described above, or may be a chip disposed in the terminal device described above. The communication apparatus 1000 may include a processor 1001 and a transceiver 1002. The processor 1001 may be configured to: perform S33 in the embodiment shown in FIG. 3, and/or support another process of the technology described herein, for example, perform all or some of other processes than the receiving process and the sending process that are performed by the terminal device described above. The transceiver 1002 may be configured to: perform S32 in the embodiment shown in FIG. 3, and/or support another process of the technology described herein, for example, perform all or some of the receiving process and the sending process that are performed by the terminal device described above.

For example, the transceiver 1002 is configured to receive a first synchronization signal from a network device, where the first synchronization signal and a second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

The processor 1001 is configured to perform synchronization with the network device based on the first synchronization signal.

The second synchronization signal is corresponding to the network device.

In a possible implementation, the transceiver 1002 is further configured to receive the second synchronization signal from the network device.

In a possible implementation,
the frequency domain resource corresponding to the second synchronization signal is M resource units, and the frequency domain resource corresponding to the first synchronization signal is K*M resource units, where M is a positive integer, and K is an integer greater than 1; or
the frequency domain resource corresponding to the first synchronization signal is M resource units, and the frequency domain resource corresponding to the second synchronization signal is K*M resource units, where M is a positive integer, and K is an integer greater than 1.

Optionally, K may be an integer greater than 1 or a decimal greater than 1.

In a possible implementation,
the first synchronization signal is generated based on a first sequence, and the second synchronization signal is generated based on a second sequence; or
the first synchronization signal is generated based on a second sequence, and the second synchronization signal is generated based on a first sequence.

In a possible implementation, the first sequence is obtained based on the second sequence and a third sequence.

In a possible implementation, that the first sequence is obtained based on the second sequence and a third sequence includes at least one of the following:
the first sequence whose length is K*L is obtained based on a sequence whose length is K*N, and the sequence whose length is K*N is obtained based on the second sequence whose length is N and a fifth sequence whose length is K;
the first sequence whose length is K*L is obtained based on a fourth sequence whose length is L and a fifth sequence whose length is K, and the fourth sequence whose length is L is obtained based on the second sequence whose length is N;
the first sequence whose length is K*L is obtained based on a sequence whose length is H*N, and the sequence whose length is H*N is obtained based on the second sequence whose length is N and the third sequence whose length is H; or
the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where
the fifth sequence whose length is K is obtained based on the third sequence whose length is H, the fourth sequence whose length is L is obtained based on the second sequence whose length is N, and L is a quantity of subcarriers included in the M resource units.

In a possible implementation, the first sequence whose length is K*L is obtained based on the fourth sequence whose length is L and the fifth sequence whose length is K, and the fourth sequence whose length is L is obtained based on the second sequence whose length is N, where
the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, \ldots, a_0b_{K-1}, a_1b_{K-1}, a_2b_{K-1}, \ldots, a_{L-1}b_{K-1}\}$;
the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K}, 0 \le i \le K*L-1\}$, where mod is a modulo operator; or
the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K}, 0 \le i \le K*L-1\}$ at equal intervals of a first length, where the first length and K*L are prime to each other.

In a possible implementation, the first sequence whose length is K*L is obtained based on the sequence whose length is H*N, and the sequence whose length is H*N is obtained based on the second sequence whose length is N and the third sequence whose length is H, where
the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2n_0, \ldots, m_{N-1}n_0, m_0n_1, m_1n_1, m_2n_1, \ldots, m_{N-1}n_1, \ldots, m_0n_{H-1}, m_1n_{H-1}, m_2n_{H-1}, \ldots, m_{N-1}n_{H-1}\}$,
the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H}, 0 \le i \le H*N-1\}$, where mod is a modulo operator; or
the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H}, 0 \le i \le H*N-1\}$ at equal intervals of a second length, where the second length and H*N are prime to each other, and mod is a modulo operator.

In a possible implementation, the third sequence is an all-1 sequence or an orthogonal sequence.

In a possible implementation,
the frequency domain resource corresponding to the second synchronization signal is M resource units, the frequency domain resource corresponding to the first synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the second synchronization signal; or
the frequency domain resource corresponding to the first synchronization signal is M resource units, the frequency domain resource corresponding to the second synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the first synchronization signal.

In a possible implementation, amplitude values of all elements included in the first sequence are the same, and the second sequence is a part of the first sequence.

In a possible implementation, the first sequence is an m-sequence.

All related content of the steps in the foregoing method embodiments may be cited in function descriptions of a corresponding functional module, and details are not described herein again.

Figure 11A:
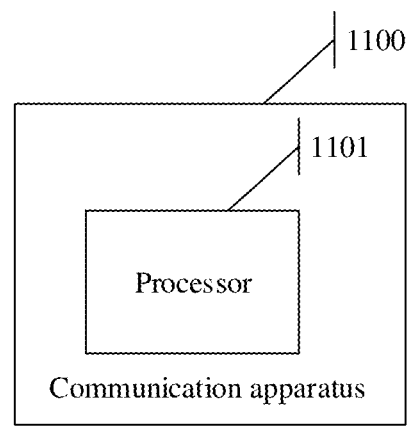
FIG. 11A and FIG. 11B are two schematic diagrams of a communication apparatus according to an embodiment.

In a simple embodiment, a person skilled in the art can figure out that the communication apparatus 900 or the communication apparatus 1000 may alternatively be implemented by using a structure of a communication apparatus 1100 shown in FIG. 11A. The communication apparatus 1100 may implement functions of the terminal device or network device described above. The communication apparatus 1100 may include a processor 1101.

When the communication apparatus 1100 is configured to implement a function of the terminal device described above, the processor 1101 may be configured to: perform S33 in the embodiment shown in FIG. 3, and/or support another process of the technology described herein, for example, may perform all or some of other processes than the receiving process and the sending process that are performed by the terminal device described above. Alternatively, when the communication apparatus 1100 is configured to implement a function of the network device described above, the processor 1101 may be configured to: perform S31 in the embodiment shown in FIG. 3, and/or support another process of the technology described herein, for example, may perform all or some of other processes than the receiving process and the sending process that are performed by the network device described above The communication apparatus 1100 may be implemented by a field-programmable gate array (FPGA), an application-specific integrated circuit (ASIC), a system on chip (SoC), a central processing unit (CPU), a network processor, a digital signal processor, a micro controller unit, a programmable logic device, or another integrated chip. The communication apparatus 1100 may be disposed in the terminal device or network device in the embodiments, so that the terminal device or the network device implements the method provided in the embodiments.

In an optional implementation, the communication apparatus 1100 may include a transceiver component, configured to communicate with another device. When the communication apparatus 1100 is configured to implement a function of the terminal device or the network device described above, the transceiver component may be configured to: perform S32 in the embodiment shown in FIG. 3, and/or support another process of the technology described herein. For example, the transceiver component is a communication interface. If the communication apparatus 1100 is a terminal device or a network device, the communication interface may be a transceiver in the terminal device or network device, for example, the transceiver 902 or the transceiver 1002. The transceiver is, for example, a radio frequency transceiver component in the terminal device or network device. Alternatively, if the communication apparatus 1100 is a chip disposed in a terminal device or network device, the communication interface may be an input/output interface of the chip, for example, an input/output pin.

Figure 11B:
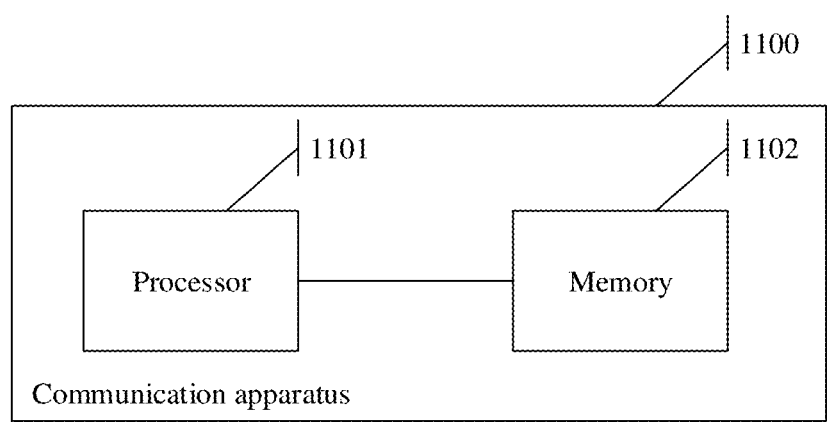

In an optional implementation, referring to FIG. 11B, the communication apparatus 1100 may further include a memory 1102. The memory 1102 is configured to store computer programs or instructions, and the processor 1101 is configured to decode and execute the computer programs or the instructions. It should be understood that the computer programs or the instructions may include a function program of the foregoing terminal device or network device. When the function program of the terminal device is decoded and executed by the processor 1101, the terminal device may be enabled to implement a function of the terminal device in the method provided in the embodiment shown in FIG. 3 in the embodiments. When the function program of the network device is decoded and executed by the processor 1101, the network device may be enabled to implement a function of the network device in the method provided in the embodiment shown in FIG. 3 in the embodiments.

In another optional implementation, the function programs of the terminal device or the network device are stored in an external memory of the communication apparatus 1100. When the function program of the terminal device is decoded and executed by the processor 1101, the memory 1102 temporarily stores a part or all of content of the function program of the terminal device. When the function program of the network device is decoded and executed by the processor 1101, the memory 1102 temporarily stores a part or all of content of the function program of the network device.

In another optional implementation, the function programs of the terminal device or the network device are set and stored in the internal memory 1102 of the communication apparatus 1100. When the internal memory 1102 of the communication apparatus 1100 stores the function program of the terminal device, the communication apparatus 1100 may be disposed in the terminal device in the embodiments. When the internal memory 1102 of the communication apparatus 1100 stores the function program of the network device, the communication apparatus 1100 may be disposed in the network device in the embodiments.

In still another optional implementation, a part of content of the function programs of the terminal device is stored in an external memory of the communication apparatus 1100, and other content of the function programs of the first terminal device is stored in the internal memory 1102 of the communication apparatus 1100. Alternatively, a part of content of the function programs of the network device is stored in an external memory of the communication apparatus 1100, and other content of the function programs of the network device is stored in the internal memory 1102 of the communication apparatus 1100.

In the embodiments, the communication apparatus 900, the communication apparatus 1000, and the communication apparatus 1100 are presented in a form in which each function module is divided for each function, or may be presented in a form in which each function module is divided in an integrated manner. The "module" herein may be an ASIC, a processor and a memory that execute one or more software or firmware programs, an integrated logic circuit, and/or another component that can provide the foregoing functions.

In addition, the communication apparatus 900 provided in the embodiment shown in FIG. 9 may alternatively be implemented in another form. For example, the communication apparatus includes a processing module and a transceiver module. For example, the processing module may be implemented by using the processor 901, and the transceiver module may be implemented by using the transceiver 902. The processing module may be configured to: perform S31 in the embodiment shown in FIG. 3, and/or support another process of the technology described herein, for example, perform all or some of other processes than the receiving process and the sending process that are performed by the terminal device described above. The transceiver module may be configured to: perform S32 in the embodiment shown in FIG. 3, and/or support another process of the technology described herein, for example, perform all or some of the receiving process and the sending process that are performed by the terminal device described above.

For example, the processing module is configured to generate synchronization signals, where the synchronization signals include a first synchronization signal and a second synchronization signal.

The transceiver module is configured to send the synchronization signals, where the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

In a possible implementation, the frequency domain resource corresponding to the second synchronization signal is M resource units, and the frequency domain resource corresponding to the first synchronization signal is K*M resource units, where M is a positive integer, and K is an integer greater than 1.

In a possible implementation, the first synchronization signal is generated based on a first sequence, and the second synchronization signal is generated based on a second sequence.

In a possible implementation, the first sequence is obtained based on the second sequence and a third sequence.

In a possible implementation, that the first sequence is obtained based on the second sequence and a third sequence includes at least one of the following:

the first sequence whose length is K*L is obtained based on a sequence whose length is K*N, and the sequence whose length is K*N is obtained based on the second sequence whose length is N and a fifth sequence whose length is K;

the first sequence whose length is K*L is obtained based on a fourth sequence whose length is L and a fifth sequence whose length is K, and the fourth sequence whose length is L is obtained based on the second sequence whose length is N;

the first sequence whose length is K*L is obtained based on a sequence whose length is H*N, and the sequence whose length is H*N is obtained based on the second sequence whose length is N and the third sequence whose length is H; or the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where the fifth sequence whose length is K is obtained based on the third sequence whose length is H, the fourth sequence whose length is L is obtained based on the second sequence whose length is N, and L is a quantity of subcarriers included in the M resource units.

In a possible implementation, the first sequence whose length is K*L is obtained based on the fourth sequence whose length is L and the fifth sequence whose length is K, and the fourth sequence whose length is L is obtained based on the second sequence whose length is N, where the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, \ldots, a_0b_{K-1}, a_1b_{K-1}, a_2b_{K-1}, \ldots, a_{L-1}b_{K-1}\}$;

the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K}, 0 \le i \le K*L-1\}$, where mod is a modulo operator; or the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K}, 0 \le i \le K*L-1\}$ at equal intervals of a first length, where the first length and K*L are prime to each other.

In a possible implementation, the first sequence whose length is K*L is obtained based on the sequence whose length is H*N, and the sequence whose length is H*N is obtained based on the second sequence whose length is N and the third sequence whose length is H, where the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2n_0, \ldots, m_{N-1}n_0, m_0n_1, m_1n_1, m_2n_1, \ldots, m_{N-1}n_1, \ldots, m_0n_{H-1}, m_1n_{H-1}, m_2n_{H-1}, \ldots, m_{N-1}n_{H-1}\}$, the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H}, 0 \le i \le H*N-1\}$, where mod is a modulo operator; or the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H}, 0 \le i \le H*N-1\}$ at equal intervals of a second length, where the second length and H*N are prime to each other, and mod is a modulo operator.

In a possible implementation, the third sequence is an all-1 sequence or an orthogonal sequence.

In a possible implementation, the frequency domain resource corresponding to the second synchronization signal is M resource units, the frequency domain resource corresponding to the first synchronization signal is K*M resource units, both M and K are positive integers, the third sequence is an all-1 sequence, and the K*M resource units include K parts, where each part includes M resource units, and a sequence carried in each part is the same as a sequence carried in the M resource units corresponding to the second synchronization signal.

In a possible implementation, amplitude values of all elements included in the first sequence are the same, and the second sequence is a part of the first sequence.

In a possible implementation, the first sequence is an m-sequence.

All related content of the steps in the foregoing method embodiments may be cited in function descriptions of a corresponding functional module, and details are not described herein again.

The communication apparatus 1000 provided in the embodiment shown in FIG. 10 may alternatively be implemented in another form. For example, the communication apparatus includes a processing module and a transceiver module. For example, the processing module may be implemented by the processor 1001, and the transceiver module may be implemented by the transceiver 1002. The processing module may be configured to: perform S33 in the embodiment shown in FIG. 3, and/or support another process of the technology described herein, for example, perform all or some of other processes than the receiving process and the sending process that are performed by the terminal device described above. The transceiver module may be configured to: perform S32 in the embodiment shown in FIG. 3, and/or support another process of the technology described herein, for example, perform all or some of the receiving process and the sending process that are performed by the terminal device described above.

For example, the transceiver module is configured to receive a first synchronization signal from a network device, where the first synchronization signal and a second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal.

The processing module is configured to perform synchronization with the network device based on the first synchronization signal.

The second synchronization signal is corresponding to the network device.

In a possible implementation, the transceiver module is further configured to receive the second synchronization signal from the network device.

In a possible implementation,
the frequency domain resource corresponding to the second synchronization signal is M resource units, and the frequency domain resource corresponding to the first synchronization signal is K*M resource units, where M is a positive integer, and K is an integer greater than 1; or the frequency domain resource corresponding to the first synchronization signal is M resource units, and the frequency domain resource corresponding to the second synchronization signal is K*M resource units, where M is a positive integer, and K is an integer greater than 1.

In a possible implementation, the first synchronization signal is generated based on a first sequence, and the second synchronization signal is generated based on a second sequence; or the first synchronization signal is generated based on a second sequence, and the second synchronization signal is generated based on a first sequence.

In a possible implementation, the first sequence is obtained based on the second sequence and a third sequence.

In a possible implementation, that the first sequence is obtained based on the second sequence and a third sequence includes at least one of the following:

the first sequence whose length is K*L is obtained based on a sequence whose length is K*N, and the sequence whose length is K*N is obtained based on the second sequence whose length is N and a fifth sequence whose length is K;

the first sequence whose length is K*L is obtained based on a fourth sequence whose length is L and a fifth sequence whose length is K, and the fourth sequence whose length is L is obtained based on the second sequence whose length is N;

the first sequence whose length is K*L is obtained based on a sequence whose length is H*N, and the sequence whose length is H*N is obtained based on the second sequence whose length is N and the third sequence whose length is H; or the first sequence whose length is K*L is obtained based on a sequence whose length is H*L, the sequence whose length is H*L is obtained based on a fourth sequence whose length is L and the third sequence whose length is H, and the fourth sequence whose length is L is obtained based on the second sequence whose length is N, where the fifth sequence whose length is K is obtained based on the third sequence whose length is H, the fourth sequence whose length is L is obtained based on the second sequence whose length is N, and L is a quantity of subcarriers included in the M resource units.

In a possible implementation, the first sequence whose length is K*L is obtained based on the fourth sequence whose length is L and the fifth sequence whose length is K, and the fourth sequence whose length is L is obtained based on the second sequence whose length is N, where the fourth sequence is $\{a_0, a_1, \ldots, a_{L-1}\}$, the fifth sequence is $\{b_0, b_1, \ldots, b_{K-1}\}$, and the first sequence whose length is K*L is $\{a_0b_0, a_1b_0, a_2b_0, \ldots, a_{L-1}b_0, a_0b_1, a_1b_1, a_2b_1, \ldots, a_{L-1}b_1, \ldots, a_0b_{K-1}, a_1b_{K-1}, a_2b_{K-1}, \ldots, a_{L-1}b_{K-1}\}$;

the fourth sequence is $\{a_0, a_1, \ldots, a_{L-1}\}$, the fifth sequence is $\{b_0, b_1, \ldots, b_{K-1}\}$, and the first sequence whose length is K*L is $\{c_i = a_{i \bmod L} b_{i \bmod K} 0 \le i \le K*L-1\}$, where mod is a modulo operator; or the fourth sequence is $\{a_0, a_1, \ldots, a_{L-1}\}$, the fifth sequence is $\{b_0, b_1, \ldots, b_{K-1}\}$, and the first sequence whose length is K*L is obtained by sampling a sequence $\{c_i = a_{i \bmod L} b_{i \bmod K} 0 \le i \le K*L-1\}$ at equal intervals of a first length, where the first length and K*L are prime to each other.

In a possible implementation, the first sequence whose length is K*L is obtained based on the sequence whose length is H*N, and the sequence whose length is H*N is obtained based on the second sequence whose length is N and the third sequence whose length is H, where the second sequence is $\{m_0, m_1, \ldots, m_{N-1}\}$, the third sequence is $\{n_0, n_1, \ldots, n_{H-1}\}$, and the sequence whose length is H*N is $\{m_0n_0, m_1n_0, m_2\,n_0, \ldots, m_{N-1}n_0, m_0n_1, m_1n_1, m_2n_1, \ldots, m_{N-1}n_1, \ldots, m_0n_{H-1}, m_1n_{H-1}, m_2n_{H-1}, \ldots, m_{N-1}n_{H-1}\}$;

the second sequence is $\{m_0, m_1, \ldots, m_{N-1}\}$, the third sequence is $\{n_0, n_1, \ldots, n_{H-1}\}$, and the sequence whose length is H*N is $\{p_i = m_{i \bmod N} n_{i \bmod H} 0 \le i \le H*N-1\}$, where mod is a modulo operator; or the second sequence is $\{m_0, m_1, \ldots, m_{N-1}\}$, the third sequence is $\{n_0, n_1, \ldots, n_{H-1}\}$, and the sequence whose length is H*N is obtained by sampling a sequence $\{p_i = m_{i \bmod N} n_{i \bmod H} 0 \le i \le H*N-1\}$ at equal intervals of a second length, where the second length and H*N are prime to each other, and mod is a modulo operator.

In a possible implementation, the third sequence is an all-1 sequence or an orthogonal sequence.

In a possible implementation, the frequency domain resource corresponding to the second synchronization signal is M resource units, the frequency domain resource corresponding to the first synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the second synchronization signal; or the frequency domain resource corresponding to the first synchronization signal is M resource units, the frequency domain resource corresponding to the second synchronization signal is K*M resource units, M is a positive integer, K is an integer greater than 1, the third sequence is an all-1 sequence, and the K*M resource units include K parts, where each part includes M resource units, and a sequence carried in each part is the same as a sequence carried in the M resource units corresponding to the first synchronization signal.

In a possible implementation, amplitude values of all elements included in the first sequence are the same, and the second sequence is a part of the first sequence.

In a possible implementation, the first sequence is an m-sequence.

All related content of the steps in the foregoing method embodiments may be cited in function descriptions of a corresponding functional module, and details are not described herein again.

The communication apparatus 900, the communication apparatus 1000, and the communication apparatus 1100 provided in the embodiments may be configured to perform the method provided in the embodiment shown in FIG. 3. Therefore, for technical effects that can be achieved by the communication apparatuses, refer to the foregoing method embodiments. Details are not described herein again.

The embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It is clear that a person skilled in the art can make various modifications and variations to the embodiments without departing from the spirit and scope of the embodiments. In this case, the exemplary embodiments may cover these modifications and variations in the embodiments, provided that they fall within the scope of the following claims and their equivalent technologies.

What is claimed is:

1. A signal sending method, comprising:
   generating a first synchronization signal and a second synchronization signal, wherein the first synchronization signal is generated based on a first sequence, and the second synchronization signal is generated based on a second sequence, wherein the first sequence is obtained based on the second sequence and a third sequence; and
   sending the first and second synchronization signals, wherein the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal,
   wherein the first sequence has a length of KCL and is obtained based on the second sequence and the third sequence according to at least one of the following:
   (1) the first sequence is obtained based on a sequence whose length is K*N, and the sequence whose length is K*N is obtained based on (1a) the second sequence whose length is N and (1b) a fifth sequence whose length is K, wherein the fifth sequence whose length is K is obtained based on the third sequence whose length is H;
   (2) the first sequence is obtained based on (2a) a fourth sequence whose length is L and (2b) a fifth sequence whose length is K and which is obtained based on the third sequence whose length is H, wherein the fourth sequence whose length is L is obtained based on the second sequence whose length is N;
   (3) the first sequence is obtained based on a sequence whose length is H*N, and the sequence whose length is H*N is obtained based on (3a) the second sequence whose length is N and (3b) the third sequence whose length is H; or
   (4) the first sequence is obtained based on a sequence whose length is H*L, the sequence whose length is H*L is obtained based on (4a) a fourth sequence whose length is L and (4b) the third sequence whose length is H, wherein the fourth sequence whose length is L is obtained based on the second sequence whose length is N,
   wherein L is a quantity of subcarriers included in M resource units, and wherein M is a positive integer.

2. The method according to claim 1, wherein the frequency domain resource corresponding to the second synchronization signal is M resource units, and the frequency domain resource corresponding to the first synchronization signal is KIM resource units, wherein M is a positive integer, and K is an integer greater than 1.

3. A signal receiving method, comprising:
   receiving a first synchronization signal from a network device, wherein the first synchronization signal and a second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal, wherein the first synchronization signal is generated based on a first sequence, and the second synchronization signal is generated based on a second sequence, wherein the first sequence is obtained based on the second sequence and a third sequence; and
   performing synchronization with the network device based on the first synchronization signal, wherein
   the second synchronization signal is corresponding to the network device,
   wherein the first sequence has a length of KCL and is obtained based on the second sequence and the third sequence according to at least one of the following:
   (1) the first sequence is obtained based on a sequence whose length is K*N, and the sequence whose length is K*N is obtained based on (1a) the second sequence whose length is N and (1b) a fifth sequence whose length is K, wherein the fifth sequence whose length is K is obtained based on the third sequence whose length is H;
   (2) the first sequence is obtained based on (2a) a fourth sequence whose length is L and (2b) a fifth sequence whose length is K and which is obtained based on the third sequence whose length is H, wherein the fourth sequence whose length is L is obtained based on the second sequence whose length is N;

(3) the first sequence is obtained based on a sequence whose length is H*N, and the sequence whose length is H*N is obtained based on (3a) the second sequence whose length is N and (3b) the third sequence whose length is H; or (4) the first sequence is obtained based on a sequence whose length is H*L, the sequence whose length is H*L is obtained based on (4a) a fourth sequence whose length is L and (4b) the third sequence whose length is H, wherein the fourth sequence whose length is L is obtained based on the second sequence whose length is N, wherein L is a quantity of subcarriers included in M resource units, and wherein M is a positive integer.

4. The method according to claim 3, wherein
the frequency domain resource corresponding to the second synchronization signal is M resource units, and the frequency domain resource corresponding to the first synchronization signal is KIM resource units, wherein M is a positive integer, and K is an integer greater than 1.

5. The method according to claim 3, wherein the frequency domain resource corresponding to the first synchronization signal is M resource units, and the frequency domain resource corresponding to the second synchronization signal is K*M resource units, wherein M is a positive integer, and K is an integer greater than 1.

6. A network device, comprising:
a processor, configured to generate synchronization signals, wherein the synchronization signals include a first synchronization signal and a second synchronization signal; and
a transceiver, configured to send the synchronization signals, wherein the first synchronization signal and the second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal, wherein the first synchronization signal is generated based on a first sequence, and the second synchronization signal is generated based on a second sequence, wherein the first sequence is obtained based on the second sequence and a third sequence,
wherein the first sequence has a length of KCL and is obtained based on the second sequence and the third sequence according to at least one of the following:

(1) the first sequence is obtained based on a sequence whose length is K*N, and the sequence whose length is K*N is obtained based on (1a) the second sequence whose length is N and (1b) a fifth sequence whose length is K, wherein the fifth sequence whose length is K is obtained based on the third sequence whose length is H;

(2) the first sequence is obtained based on (2a) a fourth sequence whose length is L and (2b) a fifth sequence whose length is K and which is obtained based on the third sequence whose length is H, wherein the fourth sequence whose length is L is obtained based on the second sequence whose length is N;

(3) the first sequence is obtained based on a sequence whose length is H*N, and the sequence whose length is H*N is obtained based on (3a) the second sequence whose length is N and (3b) the third sequence whose length is H; or (4) the first sequence is obtained based on a sequence whose length is H*L, the sequence whose length is H*L is obtained based on (4a) a fourth sequence whose length is L and (4b) the third sequence whose length is H, wherein the fourth sequence whose length is L is obtained based on the second sequence whose length is N, wherein L is a quantity of subcarriers included in M resource units, and wherein M is a positive integer.

7. The network device according to claim 6, wherein the frequency domain resource corresponding to the second synchronization signal is M resource units, and the frequency domain resource corresponding to the first synchronization signal is KIM resource units, wherein M is a positive integer, and K is an integer greater than 1.

8. A terminal device, comprising:
a transceiver, configured to receive a first synchronization signal from a network device, wherein the first synchronization signal and a second synchronization signal overlap in time domain, and within a time domain resource in which the first synchronization signal and the second synchronization signal overlap, there is an intersection set between a frequency domain resource corresponding to the first synchronization signal and a frequency domain resource corresponding to the second synchronization signal, wherein the first synchronization signal is generated based on a first sequence, and the second synchronization signal is generated based on a second sequence, wherein the first sequence is obtained based on the second sequence and a third sequence; and
a processor, configured to perform synchronization with the network device based on the first synchronization signal, wherein
the second synchronization signal is corresponding to the network device,
wherein the first sequence has a length of KCL and is obtained based on (a) the second sequence and (b) the third sequence according to at least one of the following:

(1) the first sequence is obtained based on a sequence whose length is K*N, and the sequence whose length is K*N is obtained based on (1a) the second sequence whose length is N and (1b) a fifth sequence whose length is K, wherein the fifth sequence whose length is K is obtained based on the third sequence whose length is H;

(2) the first sequence is obtained based on (2a) a fourth sequence whose length is L and (2b) a fifth sequence whose length is K and which is obtained based on the third sequence whose length is H, wherein the fourth sequence whose length is L is obtained based on the second sequence whose length is N;

(3) the first sequence is obtained based on a sequence whose length is H*N, and the sequence whose length is H*N is obtained based on (3a) the second sequence whose length is N and (3b) the third sequence whose length is H; or (4) the first sequence is obtained based on a sequence whose length is H*L, the sequence whose length is H*L is obtained based on (4a) a fourth sequence whose length is L and (4b) the third sequence whose length is H, wherein the fourth sequence whose length is L is obtained based on the second sequence whose length is N, wherein L is a quantity of subcarriers included in M resource units, and wherein M is a positive integer.

9. The terminal device according to claim 8, wherein the frequency domain resource corresponding to the second synchronization signal is M resource units, and the frequency domain resource corresponding to the first synchronization signal is KIM resource units, wherein M is a positive integer, and K is an integer greater than 1.

10. The terminal device according to claim 8, wherein the frequency domain resource corresponding to the first synchronization signal is M resource units, and the frequency domain resource corresponding to the second synchronization signal is K*M resource units, wherein M is a positive integer, and K is an integer greater than 1.

* * * * *

UNITED STATES PATENT AND TRADEMARK OFFICE
CERTIFICATE OF CORRECTION

PATENT NO. : 12,047,886 B2
APPLICATION NO. : 17/377537
DATED : July 23, 2024
INVENTOR(S) : Juan Zheng It is certified that error appears in the above-identified patent and that said Letters Patent is hereby corrected as shown below:

In the Claims

Column 58, Claim 1, Line 1, please change from "KCL" to "K*L".

Column 58, Claim 2, Line 35, please change from "KIM" to "K*M".

Column 58, Claim 3, Line 56, please change from "KIM" to "K*M".

Column 59, Claim 4, Line 24, please change from "KIM" to "K*M".

Column 59, Claim 6, Line 52, please change from "KCL" to "K*L".

Column 60, Claim 7, Line 19, please change from "KIM" to "K*M".

Column 60, Claim 8, Line 42, please change from "KCL" to "K*L".

Column 61, Claim 9, Line 10, please change from "KIM" to "K*M".

Signed and Sealed this
First Day of October, 2024

Katherine Kelly Vidal
*Director of the United States Patent and Trademark Office*